United States Patent
Jin et al.

(10) Patent No.: US 8,315,240 B2
(45) Date of Patent: Nov. 20, 2012

(54) ENHANCED UPLINK RATE INDICATOR

(75) Inventors: Hui Jin, Clinton, NJ (US); Tom Richardson, South Orange, NJ (US); Rajiv Laroia, Far Hills, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1452 days.

(21) Appl. No.: 11/486,822

(22) Filed: Jul. 14, 2006

(65) Prior Publication Data

US 2007/0076807 A1 Apr. 5, 2007

Related U.S. Application Data

(60) Provisional application No. 60/701,469, filed on Jul. 20, 2005.

(51) Int. Cl.
*H04B 7/208* (2006.01)
(52) U.S. Cl. ........ 370/344; 370/328; 370/338; 370/343; 455/42; 455/522; 455/62
(58) Field of Classification Search .................. None
See application file for complete search history.

(56) References Cited

U.S. PATENT DOCUMENTS

| | | | |
|---|---|---|---|
| 5,923,650 A | 7/1999 | Chen et al. | |
| 6,643,275 B1 | 11/2003 | Gustafsson et al. | |
| 6,661,777 B1 | 12/2003 | Blanc et al. | |
| 6,807,160 B1 | 10/2004 | Laroia et al. | |
| 6,807,426 B2 * | 10/2004 | Pankaj | 455/453 |
| 6,889,050 B1 | 5/2005 | Willars et al. | |
| 6,920,192 B1 | 7/2005 | Laroia et al. | |
| 7,013,143 B2 | 3/2006 | Love et al. | |
| 7,133,690 B2 | 11/2006 | Ranta-Aho et al. | |

(Continued)

FOREIGN PATENT DOCUMENTS

EP 1213868 6/2001

(Continued)

OTHER PUBLICATIONS

Kim, D. et al.: "Dynamic Rate Adaptation Based on Multidimensional Multicode DS-CDMA in Cellular Wireless Networks," IEEE Transactions on Communications, vol. 51, No. 2, pp. 247-260, Feb. 2003.

*Primary Examiner* — Willie J Daniel, Jr.
(74) *Attorney, Agent, or Firm* — Donald C. Kordich

(57) ABSTRACT

The claimed subject matter relates to providing uplink data rate option information in an uplink traffic channel segment. A wireless terminal may indicate a data rate option being used for the segment via an energy pattern applied to the tone-symbols of the segment. To indicate a first data rate option, additional energy may be applied to a first set of tone-symbols of the segment. To indicate a second rate option, additional energy may be applied to a second set of tone-symbols of the segment, the second set being different from the first set. According to some aspects, each implemented energy pattern may be represented by a pattern, which has a slope (e.g., in a logical, pre-hopped representation of the channel segment), where some of the patterns have positive slope and some of the patterns have negative slope. The use of positive and negative slopes facilitates the representation of more data rate options than would be possible if only one type of slope (positive or negative) for the energy pattern were utilized.

60 Claims, 9 Drawing Sheets

U.S. PATENT DOCUMENTS

| | | |
|---|---|---|
| 7,193,982 B2 | 3/2007 | Frerking et al. |
| 7,321,780 B2 | 1/2008 | Love et al. |
| 7,346,035 B2 | 3/2008 | Lee et al. |
| 7,383,057 B1 | 6/2008 | Senarath et al. |
| 7,411,924 B2 | 8/2008 | Cho et al. |
| 7,420,939 B2 * | 9/2008 | Laroia et al. ............. 370/318 |
| 7,469,013 B1 | 12/2008 | Bolt et al. |
| 7,486,620 B2 | 2/2009 | Seol |
| 7,493,132 B2 | 2/2009 | Malladi et al. |
| 7,512,153 B2 | 3/2009 | Kwon et al. |
| 7,535,879 B2 * | 5/2009 | Morioka et al. ............ 370/338 |
| 7,542,517 B2 * | 6/2009 | Kroeger ..................... 375/296 |
| 7,551,546 B2 * | 6/2009 | Ma et al. .................... 370/208 |
| 7,817,614 B2 * | 10/2010 | Yang et al. ................. 370/346 |
| 7,885,293 B2 | 2/2011 | Laroia et al. |
| 7,894,324 B2 | 2/2011 | Laroia et al. |
| 7,974,253 B2 | 7/2011 | Laroia et al. |
| 2002/0044524 A1 | 4/2002 | Laroia et al. |
| 2002/0151310 A1 | 10/2002 | Chung et al. |
| 2002/0167969 A1 | 11/2002 | Eriksson et al. |
| 2002/0181410 A1 | 12/2002 | Bae et al. |
| 2002/0196731 A1 | 12/2002 | Laroia et al. |
| 2003/0133409 A1 * | 7/2003 | Corazza ..................... 370/230 |
| 2003/0219037 A1 | 11/2003 | Toskala et al. |
| 2004/0001429 A1 | 1/2004 | Ma et al. |
| 2004/0102219 A1 | 5/2004 | Bunton et al. |
| 2004/0109432 A1 * | 6/2004 | Laroia et al. .............. 370/343 |
| 2004/0179480 A1 * | 9/2004 | Attar et al. ................ 370/252 |
| 2004/0214590 A1 | 10/2004 | Al-Housami et al. |
| 2004/0224677 A1 | 11/2004 | Kuchibhotla et al. |
| 2005/0002366 A1 | 1/2005 | Toskala et al. |
| 2005/0036441 A1 | 2/2005 | Laroia et al. |
| 2005/0036456 A1 | 2/2005 | Laroia et al. |
| 2005/0041629 A1 | 2/2005 | Lee |
| 2005/0043052 A1 * | 2/2005 | Whinnett et al. ........... 455/522 |
| 2005/0047360 A1 | 3/2005 | Love et al. |
| 2005/0048975 A1 | 3/2005 | Ranta-Aho et al. |
| 2005/0085197 A1 | 4/2005 | Laroia et al. |
| 2005/0111397 A1 * | 5/2005 | Attar et al. ................ 370/319 |
| 2005/0128976 A1 | 6/2005 | Uehara et al. |
| 2005/0143113 A1 | 6/2005 | Lee et al. |
| 2005/0180315 A1 | 8/2005 | Chitrapu et al. |
| 2005/0220042 A1 | 10/2005 | Chang et al. |
| 2005/0237932 A1 | 10/2005 | Liu |
| 2005/0238053 A1 * | 10/2005 | Iochi et al. ................. 370/473 |
| 2005/0281232 A1 | 12/2005 | Kim et al. |
| 2006/0040674 A1 | 2/2006 | Vannithamby et al. |
| 2006/0120321 A1 * | 6/2006 | Gerkis et al. .............. 370/329 |
| 2006/0126748 A1 * | 6/2006 | Lin et al. ................... 375/260 |
| 2006/0128410 A1 | 6/2006 | Derryberry et al. |
| 2006/0159120 A1 | 7/2006 | Kim et al. |
| 2006/0183483 A1 | 8/2006 | Hidaka |
| 2006/0203765 A1 | 9/2006 | Laroia et al. |
| 2006/0271704 A1 | 11/2006 | Chan et al. |
| 2006/0279435 A1 | 12/2006 | Krishnan et al. |
| 2007/0076807 A1 | 4/2007 | Jin et al. |
| 2007/0086381 A1 | 4/2007 | Lee et al. |
| 2007/0091852 A1 | 4/2007 | Malladi et al. |
| 2009/0143030 A1 * | 6/2009 | Hammerschmidt et al. .... 455/91 |
| 2009/0180563 A1 | 7/2009 | Schmidl et al. |

FOREIGN PATENT DOCUMENTS

| | | |
|---|---|---|
| JP | 2000308146 A | 11/2000 |
| JP | 2003259437 | 9/2003 |
| JP | 2004247950 | 9/2004 |
| WO | WO03041302 A1 | 5/2003 |
| WO | WO2004100569 A2 | 11/2004 |
| WO | WO2005018115 A1 | 2/2005 |
| WO | 2005020621 | 3/2005 |

* cited by examiner

ENHANCED UPLINK RATE INDICATOR

CROSS-REFERENCE

This application claims priority to U.S. Provisional Application Ser. No. 60/701,469, entitled METHODS AND APPARATUS FOR SIGNALING UPLINK DATA RATE OPTION INFORMATION, filed on Jul. 20, 2005 and is related to U.S. patent application Ser. No. 11/230,300, entitled METHODS AND APPARATUS FOR SIGNALING DATA RATE OPTION INFORMATION, filed on Sep. 19, 2005, both of which are hereby incorporated by reference in their entireties.

BACKGROUND

I. Field

The invention relates generally to communications systems, and more particularly to providing uplink rate option information in a wireless communication environment.

II. Background

Wireless networking systems have become a prevalent means to communicate with others worldwide. Wireless communication devices, such as cellular telephones, personal digital assistants, and the like have become smaller and more powerful in order to meet consumer needs and to improve portability and convenience. Consumers have become dependent upon these devices, demanding reliable service, expanded areas of coverage, additional services (e.g., web browsing capabilities), and continued reduction in size and cost of such devices.

A typical wireless communication network (e.g., employing frequency, time, and code division techniques) includes one or more base stations that provides coverage areas to subscribers as well as mobile (e.g., wireless) devices that can transmit and receive data within the coverage areas. A typical base station can simultaneously transmit multiple data streams to multiple devices for broadcast, multicast, and/or unicast services, wherein a data stream is a stream of data that can be of independent reception interest to a user device. A user device within the coverage area of that base station can be interested in receiving one, more than one or all the data streams carried by the composite stream. Likewise, a user device can transmit data to the base station or another user device.

A segment is a transmission unit in the uplink traffic channel. One uplink traffic channel segment is to transport a certain number of information bits with certain channel coding and modulation schemes. In conventional wireless terminals, an uplink traffic channel segment having uplink traffic channel data may be transmitted at one of a plurality of data rate options. Each rate option corresponds to a number of information bits being conveyed, a coding rate, and a modulation scheme. Different segments may use different rate options. When multiple data rate options are available, a conventional wireless terminal needs to be able to indicate a data rate option being employed in a transmission to a base station. An unmet need exists in the art for systems and/or methodologies that facilitate providing such information to overcome the aforementioned deficiencies.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

According to one or more aspects, a method of indicating an uplink data rate for a first transmission segment in an OFDM wireless communication environment may comprise determining a first rate option to be used in the first segment, encoding information bits to coded bits and mapping coded bits to modulation symbols in accordance with the first rate option, and identifying a first and a second predetermined subsets of the tone-symbols in the first segment as a function of the first rate option, wherein a tone-symbol is a tone in an OFDM symbol period and tones are indexed in a logical order. The method may further comprise mapping the modulation symbols to the tone-symbols of the first segment, power-scaling a modulation symbol mapped to a tone-symbol of the first subset with a first parameter, power-scaling a modulation symbol mapped to a tone-symbol of the second subset with a second parameter, the second parameter being different from the first parameter, and transmitting the first segment.

According to another aspect, an apparatus that facilitates indicating an uplink data rate for transmission segments in an OFDM wireless communication environment may comprise a processor that determines a first rate option to be used in a first segment, and identifies a first and a second predetermined subset of the tone-symbols in the first segment as a function of the first rate option, wherein a tone-symbol is a tone in an OFDM symbol period and tones are indexed in a logical order, and an encoder that encodes information bits to coded bits, maps coded bits to modulation symbols in accordance with the first rate option, and maps the modulation symbols to the tone-symbols of the first segment. The apparatus may further comprise a transmitter that power-scales a modulation symbol mapped to a tone-symbol of the first subset with a first parameter, power-scales a modulation symbol mapped to a tone-symbol of the second subset with a second parameter, the second parameter being different from the first parameter, and transmits the first segment.

According to a further aspect, an apparatus that facilitates indicating an uplink data rate for transmission segments in an OFDM wireless communication environment comprises means for determining a rate option to be used in the first segment, means for encoding information bits to coded bits and mapping coded bits to modulation symbols in accordance with the first rate option, and means for identifying a first and a second predetermined subsets of the tone-symbols in the first segment as a function of the first rate option, wherein a tone-symbol is a tone in an OFDM symbol period and tones are indexed in a logical order. The apparatus may further comprise means for mapping the modulation symbols to the tone-symbols of the first segment, means for power-scaling a modulation symbol mapped to a tone-symbol of the first subset with a first parameter, means for power-scaling a modulation symbol mapped to a tone-symbol of the second subset with a second parameter, the second parameter being different from the first parameter; and means for transmitting the first segment.

Yet another aspect relates to a computer-readable medium having stored thereon computer-readable instructions for determining a first rate option to be used in the first segment, encoding information bits to coded bits and mapping coded bits to modulation symbols in accordance with the first rate option, identifying a first and a second predetermined subsets of the tone-symbols in the first segment as a function of the first rate option, wherein a tone-symbol is a tone in an OFDM symbol period and tones are indexed in a logical order, and mapping the modulation symbols to the tone-symbols of the first segment. The computer-readable medium may further comprise instructions for power-scaling a modulation symbol mapped to a tone-symbol of the first subset with a first parameter, power-scaling a modulation symbol mapped to a tone-symbol of the second subset with a second parameter, the second parameter being different from the first parameter, and transmitting the first segment.

Still another aspect relates to a processor that executes computer-executable instructions for indicating an uplink data rate for transmission segments in an OFDM wireless communication environment, the instructions comprising determining a first rate option to be used in the first segment, encoding information bits to coded bits and mapping coded bits to modulation symbols in accordance with the first rate option, and identifying a first and a second predetermined subsets of the tone-symbols in the first segment as a function of the first rate option, wherein a tone-symbol is a tone in an OFDM symbol period and tones are indexed in a logical order. The instructions may further comprise mapping the modulation symbols to the tone-symbols of the first segment, power-scaling a modulation symbol mapped to a tone-symbol of the first subset with a first parameter, power-scaling a modulation symbol mapped to a tone-symbol of the second subset with a second parameter, the second parameter being different from the first parameter and transmitting the first segment.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Figure 1:
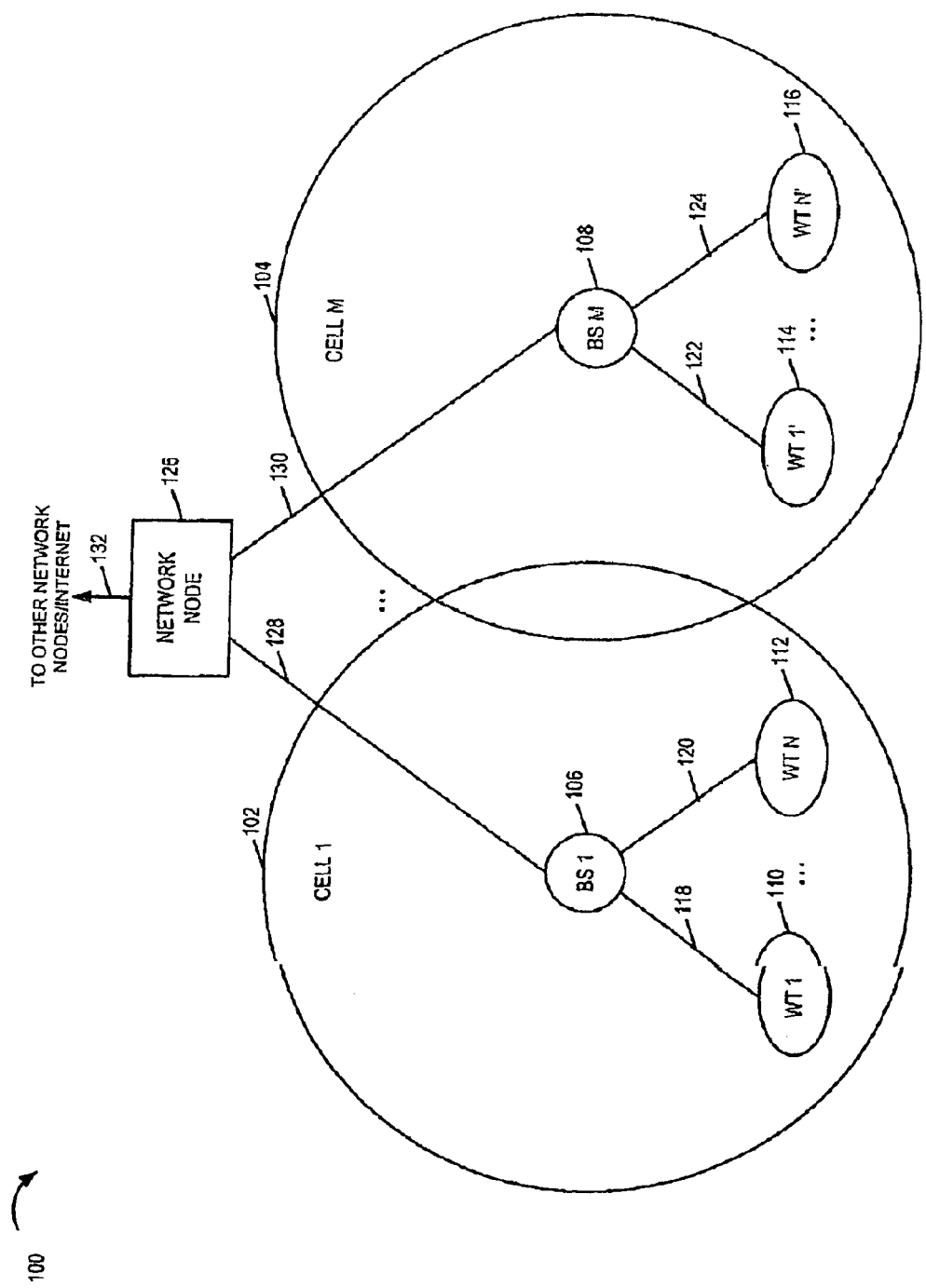
FIG. 1 is an illustration of a communications system that may be implemented in accordance with various aspects and/or methods described herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the claimed subject matter.

Furthermore, various aspects are described herein in connection with a user device. A user device can also be called a system, a subscriber unit, subscriber station, mobile station, mobile device, remote station, remote terminal, access terminal, user terminal, wireless terminal, terminal, user agent, or user equipment. A user device can be a cellular telephone, a cordless telephone, a Session Initiation Protocol (SIP) phone, a wireless local loop (WLL) station, a PDA, a handheld device having wireless connection capability, or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Various aspects described herein relate to providing uplink data rate option information in an uplink traffic channel segment, wherein a wireless terminal indicates the data rate option being used for the segment via an energy pattern applied to the tone-symbols of the segment. In order to indicate a first data rate option, additional energy may be applied to a first set of tone-symbols of the segment. In order to indicate a second rate option, which is different from the first rate option, additional energy may be applied to a second set of tone-symbols of the segment, the second set being different from the first set. In one aspect, in either the first or the second set, the number of tone-symbols in each OFDM symbol is the same. According to some aspects, each implemented energy pattern may be represented by a pattern which has a slope, where some of the patterns have positive slope and some of the patterns have negative slope. The use of positive and negative slopes facilitates the representation of more data rate options than would be possible if only one type of slope (positive or negative) for the energy pattern were utilized. In conjunction with such aspects, the use of positive and negative slopes results in at least some of the sets of tone symbols representing an energy pattern being partially overlapping with at least some other sets of tone-symbols representing a different energy pattern.

According to other aspects, the uplink traffic channel segments can use data rate options corresponding to QPSK modulation symbols, QAM16 modulation symbols, etc. When the segment conveys QPSK modulation symbols, a first amount of additional energy gain may be applied to the set of tone-symbols in the segment used to indicate the rate option. When the segment conveys QAM16 modulation symbols, a second amount of additional energy gain is applied to the set of tone-symbols in the segment used to indicate the rate option, the second amount being less than the first amount. For example, the first amount of energy may be in the range of approximately 2.5 dB to approximately 3.0 dB, and the second amount of energy may be in the range of approximately 1.5 dB to approximately 2.0 dB.

FIG. 1 is an illustration of a communications system 100 that may be implemented in accordance with various aspects and/or methods described herein. System 100 comprises apparatus and methods directed to improving uplink communications by selecting and communicating uplink data rate information. System 100 may be, e.g., an orthogonal frequency division multiplexing (OFDM) multiple access wireless communication system. System 100 may comprise a plurality of cells (cell 1 102, cell M 104), each of which represents a wireless coverage area for a corresponding base station (BS 1 106, BS M 108), respectively. A plurality of wireless terminal (WTs) (WT 1 110, WT N 112, WT 1' 114, WT N' 116) may be included in system 100. At least some of the WTs may be mobile nodes (MNs); the MNs may move throughout the system 100 and establish wireless links with different BSs, the BS corresponding to the cell in which the WT is currently located. In FIG. 1, (WT 1 110, WT N 112) are coupled to BS 1 106 via wireless links (118, 120), respectively; (WT 1' 114, WT N' 116) are coupled to BS M 108 via wireless links (122, 124), respectively.

The BSs (106, 108) may be coupled to network node 126 via network links (128, 130), respectively. Network node 126 is coupled to other network nodes, e.g., routers, other base stations, AAA server nodes, Home Agent nodes, etc. and/or the Internet via network link 132. Network links 128, 130, 132 may be, e.g., fiber optic links. Network node 126 and networks links 128, 130, 132 are part of a backhaul network linking various BSs in different cells together and providing connectivity so that a WT located in one cell can communicate with a peer node in a different cell.

System 100 is shown having cells with one sector per cell. The methods and apparatus of the present invention are also applicable in systems having more than one sector per cell, e.g., 2, 3, or more than 3 sectors per cell and in systems having different numbers of sectors per cell in different portions of the system. In addition, the methods and apparatus of the present invention are also applicable to many non-cellular wireless communications systems including at least one base station and one wireless terminal.

Figure 2:
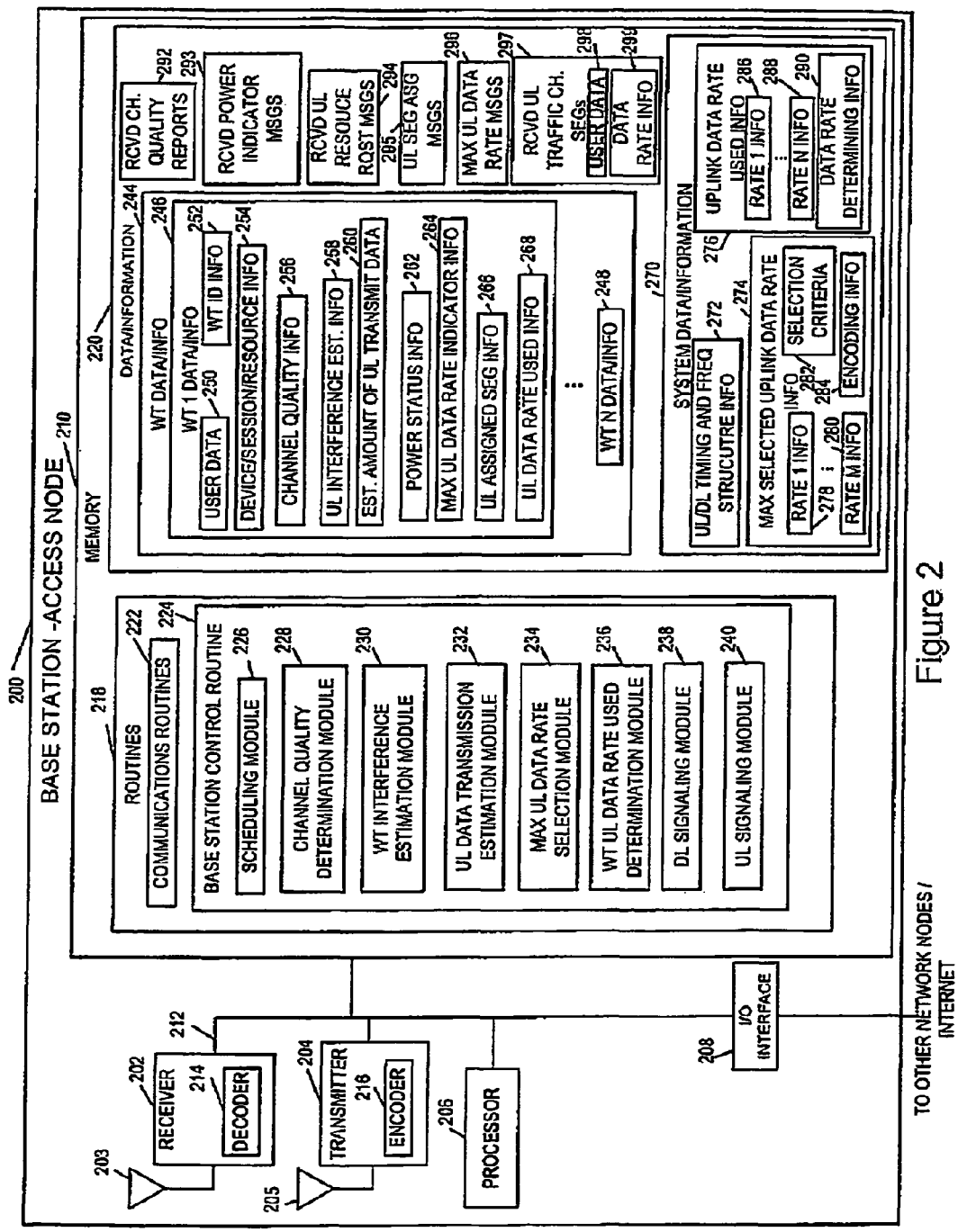
FIG. 2 is an illustration of a base station, implemented in accordance with various aspects and/or methodologies described herein.

FIG. 2 is an illustration of a base station 200, implemented in accordance with various aspects and/or methodologies described herein. BS 200 is sometimes referred to as an access node. BS 200 may be any of the BS (106, 108) of system 100 of FIG. 1. BS 200 includes a receiver 202, a transmitter 204, a processor 206, I/O interface 208, and memory 210 coupled together via a bus 212 over which the various elements may interchange data and information.

Receiver 202 is coupled to receive antenna 203 through which BS 200 may receive uplink signals from a plurality of wireless terminals. Receiver 202 includes a decoder 214 for decoding received encoded uplink signals. Received encoded uplink signals include uplink traffic channel signals including user data/information and data rate used information.

Transmitter 204 is coupled to transmit antenna 205 over which downlink signals are sent to a plurality of wireless terminals. Transmitter 204 includes an encoder 216 for encoding information prior to transmission. Downlink signals include assignments of dedicated uplink traffic channel segments and corresponding maximum uplink data rate indicator signals.

I/O interface 208 couples the BS 200 to other network nodes, e.g., routers, other base stations, AAA server nodes, Home Agent nodes and/or the Internet. I/O interface 208 provides an interface to a backhaul network providing interconnectivity between nodes in different cells. Memory 210 includes routines 218 and data/information 220. The processor 206, e.g., a CPU, executes the routines 218 and uses the data/information 220 in memory 210 to operate the BS 200 and implement methods of the present invention. Routines 218 include communications routines 222 and base station control routines 224. The communications routines 222 implement various communications protocols used by BS 200.

The base station control routines 224 control the operation of BS 200 including receiver 202 operation, transmitter 204 operation, I/O interface 208 operation, and the implementation of methods of the present invention. Base station control routines 224 include a scheduling module 226, a channel quality determination module 228, a wireless terminal interference estimation module 230, an uplink data transmission estimation module 232, a maximum uplink data rate selection module 234, a wireless terminal uplink data rate used determination module 236, a downlink signaling module 238, and an uplink signaling module 240.

The scheduling module 226, e.g., a scheduler, schedules uplink and downlink channel air link resources, e.g., segments, to wireless terminal users. Scheduler 226 operations include assigning uplink traffic channel segments to specific wireless terminals from a plurality of wireless terminal. Different uplink traffic channel segments may have different characteristics, e.g., more tones for a shorter duration or fewer tones for a longer duration, and the scheduler may take these differences into consideration when deciding which uplink traffic segment should be assigned to which user. Scheduler 226 may assign a number of uplink traffic channel segments to a wireless terminal at a point in time based upon an estimate of the amount of data to be transmitted by the WT 300. Each tone may be used to communicate a signal during an OFDM symbol transmission time period.

Channel quality determination module 228 determines, for each WT 300 under consideration, communications channel quality between the base station 200 and wireless terminal 300, e.g., based on received channel quality reports 292 from WT 300 and evaluated received uplink signals from WT 300. In some aspects, the channel quality reports 292 are based upon WT 300 measurements of received known signals, e.g., pilot signals, beacon signals, etc., communicated as downlink signals from BS 200 to WT 300, and it is assumed that uplink channel quality corresponds to downlink channel quality.

Wireless terminal interference estimation module 230 estimates, for each WT 300 under consideration, the interference that will be caused to other wireless terminals if a specific wireless terminal 300 transmits uplink signals using one or more different uplink data rates.

Uplink data transmission estimation module 232 estimates, for each WT 300 under consideration, the amount of data that the wireless terminal 300 needs to transmit to the base station. The uplink data transmission estimation module 232 can base its estimation on things such as: received resource requests, unfulfilled received resource requests, previously allocated uplink traffic channel segments, an ack/nack ratio in response to received uplink traffic channel segment signals, uplink rate previously selected for use by the wireless terminal, type of wireless terminal, e.g., data terminal, voice cellular device, voice/video/messaging cellular device, etc., type of uplink signaling, e.g., voice, data, video, etc., service plan, and/or historical usage information corresponding to the WT 300.

Maximum uplink data rate selection module 234 selects a maximum uplink data transmission rate to be used by a WT 300 when transmitting uplink signals to the BS 200 on a corresponding assigned uplink traffic channel segment, said selected maximum uplink data transmission rate being one a plurality of possible transmission data rates. Maximum uplink data rate selection module 234 selects, for each assigned uplink traffic channel segment, a maximum data rate that the WT assigned the uplink traffic segment should use. Maximum uplink data rate selection module 234 bases its selection upon: the estimated quality of the wireless communications channel, the interference estimates, and/or received battery information corresponding to the WT 300.

WT uplink data rate used determination module 236 determines an uplink data transmission rate selected and utilized by the WT 300 for the uplink traffic channel segment from the received signals conveyed in the uplink traffic channel segment. In some aspects, the utilized uplink data rate information is indicated by the location of additional energy beyond the energy used to communicate data on a predetermined subset of one or more signals used to communicate the data in the uplink traffic channel segment. Different subsets of signals having the additional energy can correspond to different possible data rates that could have been selected and used by the WT.

Downlink signaling module 238 controls operation of the transmitter 204 and its encoder 216 to transmit downlink signals including uplink traffic segment assignment information and associated maximum uplink data rate indicator, the base station selected maximum uplink data transmission rate to be used by the WT 300 assigned the uplink traffic channel segment.

Uplink signaling module 240 controls operations of receiver 202 and its decoder 214 to receive and process uplink signals including: resource requests, channel quality reports, battery indicator messages and uplink traffic channel signals from a plurality of WTs. The uplink signaling module 240 also forwards each determined uplink data transmission rate, e.g., identifying coding rate information and/or modulation type information, from module 236 to decoder 214 to be used to recover user/data information conveyed in the corresponding uplink traffic channel segment signals.

Data/information 220 includes a plurality of sets of WT data/information 244 (WT 1 data/info 246, WT N data info 248) and system data/information 270. WT 1 data/information 246 includes user data 250, WT identification information 252, device/session/resource information 254, channel quality information 256, uplink interference estimate information 258, estimated amount of uplink transmit data 260, battery status information 262, maximum uplink data rate indicator information 264, uplink assigned segment information 266, and uplink data rate used information 268.

User data 250 includes user data/information such as e.g., data/info representing voice, text or video, received on uplink traffic channel segments from WT 1 intended to be forwarded to a peer node of WT 1 in a communications session with WT 1. User data 250 may also include user data/information sourced from a peer node of WT 1 to be communicated to WT 1 via downlink traffic channel segment signals.

WT identification information 252 includes, e.g., a base station assigned active user identifier and an IP address associated with WT 1. Device/session/resource information 254 includes uplink and downlink segments, e.g., traffic channel segments, assigned to WT 1 by scheduling module 226 and session information including address and routing information pertaining to peer nodes of WT1 in communication sessions with WT 1.

Channel quality information 256 includes information obtained or derived from a received channel quality report 292 from WT 1 and channel quality information determined from measurements and evaluation of uplink signals from WT1. Channel quality information 256 is an output of channel quality determination module 228 and is used as an input to maximum uplink data rate selection module 234.

Uplink interference estimation information 258 includes base station estimates of the potential interference levels that WT1 is expected generate to other WTs if WT1 transmits uplink signals at various uplink transmission rates being considered for selection by the BS as the maximum uplink data transmission rate. Uplink interference estimation information 258 is an output of module 230 and an input to module 234. Estimated amount of uplink transmission data 260 is a BS 200 estimate, using information currently available to BS 200, of the current uplink data transmission needs of WT1. Estimated amount of uplink transmission data 260 may be used by scheduling module 266 in determining the number of uplink traffic channel segments to assign to WT1.

Power status information 262 includes information pertaining to WT1 extracted from received power indicator messages 293. The power indicator messages 293 may provide information on remaining battery power and/or information referred to sometimes herein as backoff power information. Backoff power information indicates the amount of transmission power available after the allocation of power to a set of signals, e.g., a predetermined signals corresponding to one or more control channels, e.g., corresponding to a dedicated control channel (DCCH), which are subject to power control from the base station. The power control may be, e.g., a closed loop power control process. The total amount of output transmission power for the WT may be limited by law or other constraints, e.g., battery power, such that after the WT allocates power to a predetermined set of signals there is a limited amount of transmission power available for the transmission of other signals, e.g., user data. The allocation of the power to the predetermined set of signals may be performed under direction of one or more control signals from the base station instructing the WT to increase or decrease the amount of power used to transmit the predetermined signals. In some aspects, the base station measures one or more received signals in the set of predetermined signals and instructs the WT to adjust the power level of the predetermined signals to increase or decrease the transmission power dedicated to the predetermined set of signals. While the base station may instruct changes in the transmission power dedicated to the predetermined set of signals, all the power control commands may not be received making it difficult for the base station to know the actual amount of transmission power dedicated by the WT to the transmission of the predetermined set of signals. The backoff power information provides the base station with an indication of the amount of power available at the WT sending the backoff power signal for transmitting signals other than the predetermined set of signals. From the backoff power signal, in cases where the base station knows the WTs total transmission power which can be used, either because it is fixed or reported to the base station, the base station can determine not only the amount of power available for transmission of signals other than the predetermined set of signals but also the amount of power allocated to the predetermined set of signals. The amount of power available for signals other than the predetermined set of signals is used by the base station in some aspects in selecting the maximum transmission rate allowed to be used by a particular WT for uplink signaling at a particular point in time.

An indication of the amount of available power for transmitting signals other than the predetermined set of signals and/or available battery power can be, and in various aspects are, considered by maximum uplink data rate selection module 234 in selecting the maximum allowable uplink data rate for the WT1 uplink traffic channel segment. For example, the amount of available transmission power may limit the maximum data rate possible with the base station selecting a maximum data rate option which can be supported given the power believed to be available at the WT for the transmission of data signals. As the amount of power available for transmitting signals other than said predetermined set of signals declines, lower data rate options may be selected as the maximum permitted uplink data rate option while increases in available transmission power may result in a maximum permitted uplink data rate option corresponding to higher data rates being selected for the wireless terminal reporting the increased amount of available power.

Maximum uplink data rate indicator information 264 is an output of the maximum uplink data rate selection module 234 and indicates the base station selected maximum uplink data transmission rate which is the maximum uplink data transmission rate WT1 is permitted to use when transmitting uplink signals on the assigned corresponding uplink traffic channel segment. In some aspects, the maximum uplink data rate indicator includes, at most, a maximum number of bits that is less than the number of bits required to uniquely specify the full set of uplink data transmission rates which can be used by WT1. Maximum uplink data rate indicator information 264 is included in a maximum uplink data rate message 296 transmitted via the control of downlink signaling module 238 by BS 200 to WT1.

Uplink assigned segment information 266 includes information identifying uplink traffic channel segments assigned to WT1, encoded data/information conveyed in such segments, and data/information recovered from such segments including frames of user data. Uplink data rate used information 268 includes the WT selected and utilized uplink data transmission rate in each of uplink traffic channel segments assigned to WT1. Uplink data rate used information 268 may include coding rate information and/or modulation scheme information. Uplink data rate used info 268 is an output of WT UL data rate determination module 236 and is used by decoder 214 in the recovery of user data/information.

System data/information 270 includes uplink/downlink timing and frequency structure information 272, maximum selected uplink data rate information 274 and uplink data rate used information 276. Uplink/downlink timing and frequency structure information 272 includes, e.g., symbol timing information, tone spacing information, number of uplink tones, number of downlink tones, uplink carrier frequency, downlink carrier frequency, uplink bandwidth, downlink bandwidth, uplink set of tones, downlink set of tones, uplink tone hopping information, uplink dwell information, downlink tone hopping information, downlink traffic segment structure information, uplink traffic segment structure information, repetitive timing structures, e.g., symbol time intervals and grouping of symbol time intervals into, e.g., dwells, half-slots, slots, superslots, beacon slots, ultra slots, etc.

Maximum selected uplink data rate information 274 includes a plurality of sets of data rate information (rate 1 info 278, rate M information 280), selection criteria 282, and encoding information 284. Each set of rate info (278, 280) corresponding to one of the potential data rates that may be selected by BS 200 module 234 to be indicated as a maximum uplink data transmission rate. Each set of data rate info (278, 280) may include or correspond to a coding rate and/or a modulation scheme. Selection criteria 282 includes predetermined limits and values used by module 234 in determining the max selected uplink data rate, e.g., SNR reference levels, SIR reference levels and/or rate back-off amounts associated with received low battery level indication information.

Encoding information 284 includes information used to encode the BS selected maximum uplink data rate indicator into a message to be signaled to the WT assigned the corresponding uplink traffic channel segment. In some aspects, the max uplink data rate indicator is included in the uplink traffic channel assignment message, while in other aspects it is included in a different downlink message. In some aspects, a wireless terminal is assigned a maximum uplink data transmission rate on a per uplink traffic channel segment basis or group of traffic channel segments, e.g., assigned at any one time. In other aspects, a WT may be assigned a maximum uplink data transmission rate which remains in effect until the BS signals a new maximum uplink data transmission rate.

Uplink data rate used information 276 includes a plurality of sets of data rate information (rate 1 information 286, rate N information 288) and data rate determining information 290. Each set of data rate information (286, 288) corresponds to a possible uplink data rate which can be used by a WT 300 for transmission of uplink traffic channel segment signals. Each uplink data rate can correspond to a coding rate and/or a modulation scheme. Data rate determining information 290 includes information used by module 236 to decode the uplink rate selected and used during an uplink traffic channel segment by a WT 300. Data rate determining information 290 can include, e.g., sets of locations within a segment or patterns within the segment identifying where additional energy has been allocated to specific tones during specific symbol transmission times of the segment, each different set corresponding to a different uplink data rate that may have been selected by WT 300.

In some aspects, different sets of information 274 and 276 may exist for different wireless terminals or different types or classes of wireless terminals. For a given wireless terminal, the number M of max selected uplink data rates (278,280) is less than or equal to the number N of uplink data rates used (286, 288). In some aspects, for at least some wireless terminals, the number of max selected uplink data rates M (278, 280) is less than the number N of uplink data rates used (286, 288).

Data/information 220 also includes received channel quality reports 292, e.g., feedback reports of measured channel conditions, received power indicator messages 293, e.g., transmission power back-off signals and/or battery power signals, received uplink resource request messages 294, e.g., requests for an uplink traffic channel segment or segments and received uplink traffic channel segments 297, said received messages 292, 293, 294, 297 being sourced from a plurality of WTs 300. The received uplink traffic channel segment messages 297 include user data 298 and data rate information 299, the user data 298 having been communicated using the coding rate and/or modulation scheme indicated by the rate information 299. Data/information 220 also includes, according to some aspects, uplink segment assignment messages 295, e.g., assignments of dedicated uplink traffic channel segments to specific WTs and maximum uplink data rate messages 296 conveying maximum data rate indicators to WTs. In some aspects maximum uplink data rate message information is included as part of uplink segment assignment messages.

Figure 3:
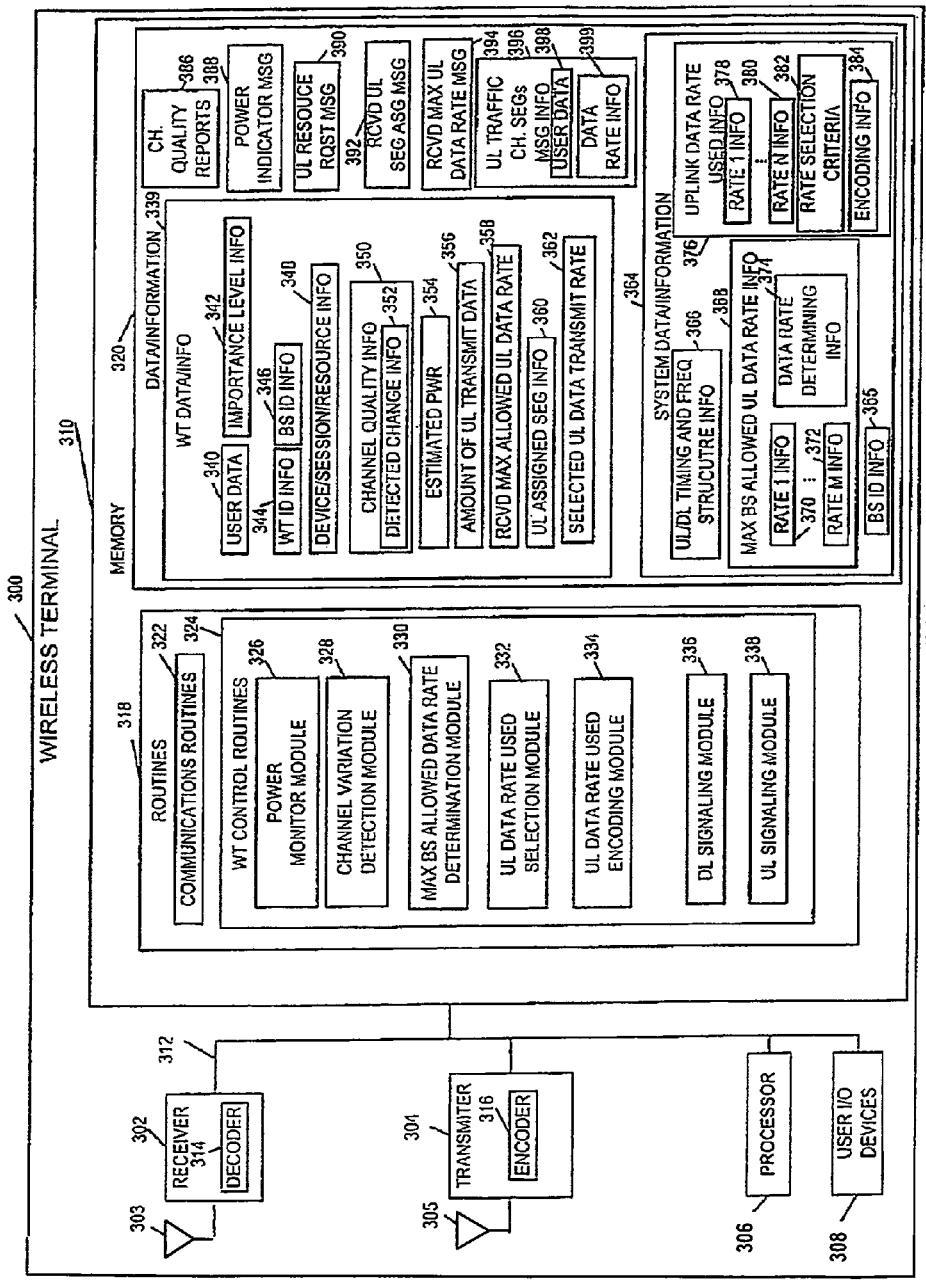
FIG. 3 illustrates of a wireless terminal, implemented in accordance with one or more aspects and/or methods described herein.

FIG. 3 illustrates of a wireless terminal 300, implemented in accordance with one or more aspects and/or methods described herein. WT 300 may be any of the WTs (110, 112, 114, 116) of system 100 of FIG. 1. Exemplary WT 300 includes a receiver 302, a transmitter 304, a processor 306, user I/O devices 308, and memory 310 coupled together via a bus 312 over which the various elements may interchange data and information. Receiver 302 is coupled to receive antenna 303 through which WT 300 receives downlink signals from BS 200 including assignments for uplink traffic channels and maximum uplink data rate indicator signals. Receiver 302 includes a decoder 314 which is used by WT 300 to decode received downlink signals from BS 200.

Transmitter 304 is coupled to transmit antenna 305 through which WT 300 transmits uplink signals to BS 200 including channel quality reports, power indication signals, uplink resource request messages, and uplink traffic channel segment signals including user data and data rate information. In some aspects, the same antenna is used as both the transmit antenna 305 and the receive antenna 303. Transmitter 204 includes an encoder 316 for encoding uplink data/information prior to transmission.

User I/O devices 308 includes, e.g., microphones, speakers, keypad, keyboard, mouse, touch-screen, camera, displays, alarms, vibration device, etc. Various user I/O devices 308 are used to input user data/information intended for peer nodes of WT 300 and to output received data/information from peer nodes of WT 300. In addition, user I/O devices 308 are used by an operator of WT 300 to initiate various functions, e.g., power on, power off, place a call, terminate a call, etc. Memory 310 includes routines 318 and data/information 320. The processor 306, e.g., a CPU, executes the routines 318 and uses the data/information 320 in memory 310 to control the operation of WT 300 and implement the methods of the present invention.

Routines 318 include a communications routine 322 and wireless terminal control routines 324. The communications routine 334 implements the various communications protocols used by the WT 300. The wireless terminal control routines 324 control operations of WT 300 including the operation of receiver 302, transmitter 304, and user I/O devices 308. Wireless terminal control routines 324 includes a power monitor module 326, a channel variation detection module 328, a maximum base station allowed data rate determination module 330, an uplink data rate used selection module 332, an uplink data rate used encoding module 334, a downlink signaling module 336, and an uplink signaling module 338.

Power monitor module 326 monitors the amount of power available for transmitting signals after transmission power is allocated to a set of signals, e.g., a predetermined set of control channel signals. The module 326 may also monitor the status of the WT's battery, e.g., energy level and current rate of energy level decline or increase, and estimates remaining battery power. Estimated power information 354, an output of power monitor module 326 is used by the uplink data rate selection module 332 in determining the actual uplink data rate to be used for transmitting signals, e.g., user data signals. In some aspects, estimated power info 354 also includes information indicative as to whether the wireless terminal 300 is currently operating on its own battery reserve or an external power source, e.g., a car's electrical system, in which case the power used for current uplink signaling will not further deplete the battery. In addition, the power monitor module 326, in some aspects, generates power indicator messages 388, e.g., WT power back-off messages and or battery power information messages to BS 200.

Channel variation detection module 328 measures channel quality, e.g., based on received known signals, e.g., pilot signals, beacon signals, etc. communicated from BSs 200 over the downlink and generates channel quality reports 386, e.g., periodically, which are subsequently communicated to a BS 200. The channel quality information 350, an output of module 328, made available to uplink data rate used selection module 332, is generally updated more frequently than the channel quality reports 386, thus providing WT 300 with more current information at any given time to make a better decision as to the uplink data rate to use. In addition, the channel variation detection module 328 detects changes in channel quality and/or changes in operating conditions and/or environment which can be expected to change the channel quality. Channel quality information 350 including detected change information 352 is made available to the uplink data rate used selection module 332. Change variation detection module 328 can detect changes due to factors such as a change in wireless terminal 300 velocity, e.g., as a wireless terminal changes from a static device to a moving device, or a change in environments, e.g., a WT moves from a rural to a city environment, a WT enters a tunnel, etc. Such variations may be detectable by the WT and such information may be useful in making decisions as to which uplink data rate to use. In many aspects, it may be inefficient to communicate such change information to the BS 200 for use in WT 300 uplink maximum data rate selection and/or time constraints associated with the validity of such information may make it impractical. However, such change information can be, and is used, in some aspects, by the wireless terminal's uplink data rate used selection module 332.

Maximum base station allowed data rate determination module 330 processes received signals conveying a maximum uplink data rate indicator, e.g., a received maximum uplink data rate message 394. In some aspects, the maximum uplink data rate indicator may be conveyed in a different message, e.g., a received uplink segment assignment message 392. Module 330 uses information 320 including data rate determining information 374, e.g., data rate level decoding information, to determine the received maximum allowable uplink data rate 358, corresponding to at least some uplink traffic channel segments assigned to WT 300, from a plurality of potential maximum uplink data rates corresponding to information (370, 372).

Uplink data rate selection module 332 determines the selected uplink data transmit rate 362 to use for assigned uplink traffic channel segments identified in uplink assigned segment information 360. Each data rate may correspond to a coding rate and/or modulation scheme. Uplink data rate selection module 332 uses data/information 320 including the amount of uplink user data to transmit 356, the importance level of the information to transmit 342, the estimated power information 354, channel quality information 350 including detected change information 352, and data rate selection criteria 382 to select a selected uplink data transmit rate 362 less than or equal to the received maximum allowed uplink data rate 358 from among the potential uplink data rates supported by WT 300 identified in info (378,380).

Uplink data rate used encoding module 334 uses the data/info 320 including encoding information 384 to encode the selected uplink data transmit rate 362 for a given uplink traffic channel segment along with the user data/info to be communicated in the uplink traffic channel segment. In some aspects, the encoding information 384 specifies subsets of locations (within a set of locations of the time/frequency grid corresponding to an uplink traffic channel segment) to have additional energy placed thereon beyond the energy used to communicate the data, different subsets of locations for the same uplink traffic channel segment corresponding to different uplink data rates used to communicate the data. In some aspects, the additional energy is at least 2 dB above the energy used to transmit the data. In some aspects, using a dwell uplink structure and uplink segments, one of the symbol transmission time intervals of each dwell of the uplink segment, e.g., the first symbol time interval of the dwell, is used to convey a subset of signals with additional energy; a sequential pattern of tones selected to convey the additional energy on the subset of signals during the uplink segment being used to convey the data rate used, different patterns corresponding to different data rates.

Downlink signaling module 336 controls operation of the receiver 302 and decoder 304 to receive and process downlink signals from a BS 200, said downlink signals including uplink traffic channel segment assignment messages 392 and maximum uplink data rate indicator messages 394. Uplink signaling module 338 controls the operation of transmitter 304 and encoder 316 to encode and transmit uplink signals to BS 200, said uplink signals including channel quality reports 386, power indicator messages 388, uplink resource request messages 390 and uplink traffic channel segment messages 396. The uplink traffic channel segment messages 396 include user data 398 and data rate information 399.

Data/information 320-includes WT data/info 339, system data/information 364, channel quality reports 386, e.g., feedback reports of measured channel conditions, power indicator messages 388, e.g., transmission power back-off signals, uplink resource request messages 390, e.g., requests for an uplink traffic channel segment or segments, received uplink segment assignment messages 392, e.g., assignments of dedicated uplink traffic channel segments to WT 300, received maximum uplink data rate messages 394 conveying maximum data rate indicators to WT300 and uplink traffic channel segment message information 396. The uplink traffic channel message information 396 includes user data 398 and corresponding data rate information 399. The uplink traffic channel message information 396 is transmitted using assigned uplink traffic segments via transmitter 304 under the control of uplink signaling module 338 to BS 200.

WT data/information 339 includes user data 340, importance level information 342, WT identification (ID) information 344, base station ID information 346, device/session/resource information 348, channel quality information 350 including detected change information 352, power information 354, amount of uplink transmit data 356, received maximum allowable uplink data rate 358, uplink assigned segment information 360, and selected uplink data transmit rate 362. User data 340 includes data/information intended for a peer of WT 300 in a communications session with WT 300 and transmitted by WT 300 to BS 200 over uplink traffic channel segments. User data 340 also includes data/information sourced from a peer of WT 300 in a communications session with WT 300 and received from BS 200 via downlink traffic segments.

Importance level information 342 includes information associated with different portions of uplink user data to be transmitted identifying the importance of the portions of data, e.g., in terms of priority, application, urgency to transmit, etc. Different applications and/or peers may be prioritized, e.g., based on a charging model, user preferences, and/or predetermined agreements. Different applications, e.g., push-to-talk feature, voice phone call, video stream, still video image, text data, etc., may have different transmission latency requirements. Relative importance levels between competing portions of uplink data may change as new uplink user data/info is received, e.g., via user I/O devices 308. The importance level associated to a portion of uplink data may change as a function of time. For example, a portion of data may represent information for a voice over Internet Protocol (VoIP) call, which has certain latency constraints; therefore as time advance, without transmission of the buffered VoIP data and the acceptable window for transmission begins to shorten, the importance level may increase.

Wireless terminal identification information 344 includes, e.g., a WT IP address and a BS 200 assigned WT active user identifier. Base station identifier information 346 includes an identifier, e.g., a value distinguishing the specific BS 200 point of network attachment to which WT 300 is using as its current point of network attachment, from among a plurality of different BS point of network attachment in the wireless communications system. In some aspects BS ID information 346 includes information identifying a specific sector and/or carrier frequency being used by the BS point of network attachment. Device/session/resource information 348 includes uplink and downlink segments, e.g., traffic channel segments, assigned to WT 300 and session information including address and routing information pertaining to peer nodes of WT 300 in communication sessions with WT 300. Channel quality information 350 includes information measured, derived and estimated pertaining to the wireless communications channel between WT 300 and BS 200. Channel quality information 350 includes detected change information 352 identifying changes in the channel quality and detected changes which can be expected to result in changes in channel quality.

Estimated power information 354 is an output of the power monitor module 326 and includes back-off power information and/or information pertaining to the battery condition and current state of battery drain. Amount of uplink transmit data 356 is a measure of the amount of user data waiting to be transmitted on uplink traffic channel segments to BS 200. Amount of uplink transmit data 356 includes, e.g., information identifying amounts of data which: have not yet been transmitted, have been transmitted or are in the process of transmission but the WT does not know success/failure status of the transmission and amounts of data which have been unsuccessfully transmitted and require retransmission. Amount of uplink transmit data 356 varies as new data to transmit is received via user I/O interfaces 308, as data is successfully transmitted, and as buffered data to be transmitted is dropped, e.g., due to a timing requirement associated with the data being exceeded. Received maximum allowed uplink data rate 358 includes information identifying the BS assigned maximum uplink data rate indicator indicating the maximum uplink data rate that the WT 300 is permitted to use for assigned uplink traffic channel segments to which the rate indicator corresponds. Different assigned uplink traffic channel segments may be assigned different maximum uplink data rates.

Uplink assigned segment information 360 includes information identifying the uplink traffic channel segments assigned by BS 200 to WT 300, e.g., in received uplink segment assignment messages 392. Uplink assigned segment info 360 also includes information to be communicated via those assigned segments, e.g., user data 398 and data rate information 399 in uplink traffic channel messages 396. Selected uplink transmission rate 362 includes the selection by module 332 for each assigned uplink traffic channel segment, the selected data rate being less than or equal to the received maximum allowed uplink data rate 358 for the uplink traffic channel segment.

System data/information 364 includes base station identification information 365, uplink/downlink timing and frequency structure information 366, maximum base station allowed uplink data rate information 368 and uplink data rate used information 376. Uplink/downlink timing and frequency structure information 366 includes, e.g., symbol timing information, tone spacing information, number of uplink tones, number of downlink tones, uplink carrier frequency, downlink carrier frequency, uplink bandwidth, downlink bandwidth, uplink set of tones, downlink set of tones, uplink tone hopping information, uplink dwell information, downlink tone hopping information, downlink traffic segment structure information, uplink traffic segment structure information, repetitive timing structures, e.g., symbol time intervals and grouping of symbol time intervals into, e.g., dwells, half-slots, slots, superslots, beacon slots, ultra slots, etc. Different sets of UL/DL timing and frequency structure information 366 may exist and be stored in WT 300 corresponding to different BSs 200 in the wireless communications system.

Maximum BS allowed uplink data rate information 368 includes a plurality of sets of data rate information (rate 1 info 370, rate M information 372) and data rate determining information 374. Each set of rate info (370, 372) corresponding to one of the potential data rates that may be determined by module 330 to be indicated as a maximum uplink data transmission rate, e.g., for an assigned uplink traffic channel segment. Data rate determining information 374 includes information used to decode a received signal including max uplink data rate indicator information and to extract the data rate level being communicated from the base station.

Uplink data rate used information 376 includes a plurality of sets of data rate information (rate 1 information 378, rate N information 380), data rate selection criteria 382, and encoding information 384. Each set of data rate information (378, 380) corresponds to a possible uplink data rate which can be used by WT 300 for transmission of uplink traffic channel segment signals. Each uplink data rate corresponds to coding rate and/or modulation type information. Data rate selection criteria 382 includes predetermined and/or dynamic values, limits, comparison references, etc., used by UL data rate selection module 332 when choosing a selected UL data transmit rate 362 from the set of data rates in information (378, 382) for a given uplink traffic channel segment, the selected data rate 362 being less than or equal to the maximum allowed uplink data rate for the given uplink traffic channel segment. Encoding information 384 includes information used to encode a selected uplink data transmit rate 362 with the user data for an uplink traffic channel segment. For example, for a given uplink traffic channel segment within the uplink timing structure used by the BS 200, the encoding information 384 may specify a set of locations, e.g., tone and symbol timing positions within a time frequency grid, for which uplink signals communicated using those locations have additional energy added in addition to the normal energy level used to communicate the user data/information. Different patterns of sets of locations for a given uplink traffic channel segment may correspond to different uplink data rates used.

In some aspects, different sets of information 366, 368 and/or 376 may exist for different base stations within the wireless communications system. For a given base station for a given uplink traffic channel segment within the uplink structure, the number M of max BS allowed uplink data rates (370, 372) is less than or equal to the number N of uplink data rates used (378, 380). In some aspects, the number of max BS allowed uplink data rates M (370, 372) is less than the number N of uplink data rates used (378, 380). In some such aspects, the maximum uplink data rate indicator includes, at most, a number of bits which is less than the number of bits required to uniquely identify the plurality of possible uplink data transmission rates.

Figure 4:
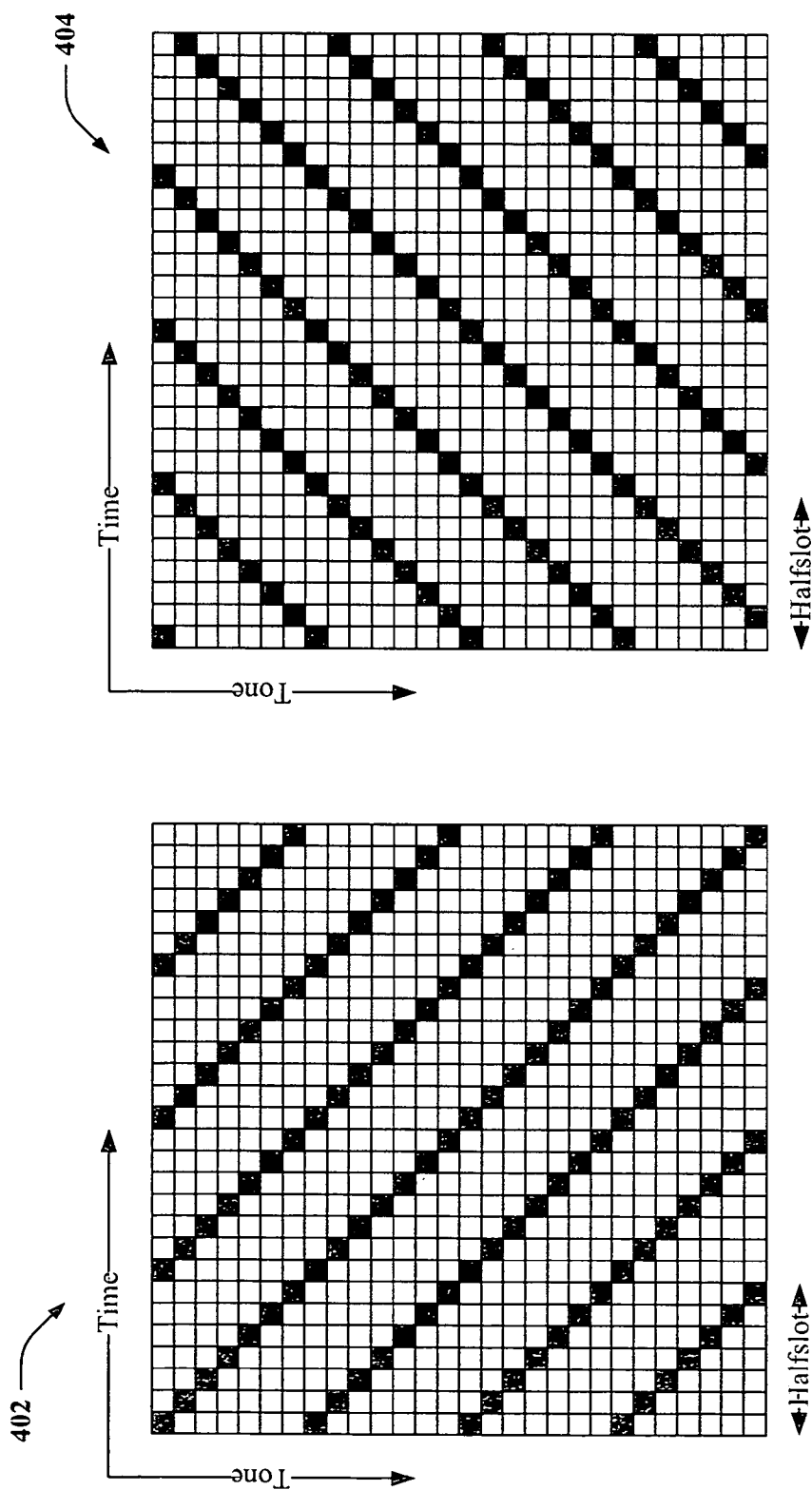
FIG. 4 is an illustration of 28-tone uplink traffic channel (UL.TCH) segments that facilitate providing multiple uplink channel rate option indications in a wireless communication environment, in accordance with various aspects.

FIG. 4 is an illustration of 28-tone uplink traffic channel (UL.TCH) segments that facilitate providing multiple uplink channel rate option indications in a wireless communication environment, in accordance with various aspects. According to an example, a first 28-tone segment 402 is depicted.

A segment can be a traffic segment in which user data or control messages can be sent. In the exemplary OFDM system, a segment comprises a number of tones over a number of OFDM symbols. For the sake of description, the tones are indexed in a logical domain in the sense that before the signal is transmitted, each tone will be mapped to a corresponding physical frequency location according to a frequency hopping function. A set of consecutive OFDM symbols may be grouped into a halfslot. For example, a halfslot comprises 7 consecutive OFDM symbols. In some aspects, a given logical tone may be mapped to a different physical frequency location in successive halfslots.

In the figure, the first 28-tone segment 402 comprises 28 logical tones over 4 halfslots. Each box in segment 402 represents a tone-symbol, i.e., a tone in an OFDM symbol. In the OFDM system, a modulation symbol, which is complex number, may be modulated with a tone-symbol. The modulation symbols of the segment may be generated by encoding a block of information bits into a set of coded bits and mapping them into points in a given modulation constellation such as QPSK or 16-point QAM. The modulation symbols may furthermore be power-scaled so that the right amount of energy is spent on each modulation symbol and the overall signal energy of the segment is sufficient for the signal to be successfully decoded by the receiver.

In accordance with some aspects, the tone-symbols of the segment are divided into two subsets, and two different power scaling factors are associated with the two subsets, respectively. A modulation symbol mapped to a tone-symbol is power scaled by one of the two factors depending on which subset the tone-symbol belongs to.

In particular, a number of darkened tone-symbols that correspond to the modulation symbols to which a scaling factor, x2, may be applied (e.g., to which extra transmission energy may be added to indicate a rate option), while white tone-symbols have a scaling factor, x1, applied thereto. It will be understood that the illustrated segment is a pre-hopped, logical channel segment. For instance, segment 402 has a sloped pattern that is indicative of a first rate option (e.g., rate option 0). Shifting each power-boosted symbol to the right by one symbol, in a modulo manner, can indicate a second data rate option (e.g., rate option 1), and so on, up to seventh data rate option (e.g., rate option 6). A rate option is a combination of the coding and modulation schemes used in the segment. Thus, the 7-symbol half slot may employ 7 different sloped patterns with a slope of negative 1 to signal 7 distinct rate options. To balance the transmission power budget, the number of tone-symbols with extra transmission power is the same from one OFDM symbol to another. In the example, the number is equal to 4. Although this and other figures describe exemplary sloping patterns, it will be understood that other patterns are possible to indicate one or more rate options, and that at the subject systems and methods are not intended to be limited to sloped indicator patterns.

In accordance with another aspect, a second 28-tone segment 404 is also shown. The segment 404 is to send with a rate option which is different from any of the seven rate options: rate option 0, 1, . . . , 6 described above. To signal this new rate option (rate option 7), the second segment may employ a pattern with slope equal to positive 1. The sloped pattern may be shifted rightward to indicate data rate options 8-13. Thus, by employing both positive and negative "slopes" to the indicator patterns, a greater number of data rate options may be indicated as compared to an algorithm that utilizes only one slope. To balance the transmission power budget, the number of tone-symbols with extra transmission power is the same from one OFDM symbol to another. In the example, the number is equal to 4. Note that in the above examples of segments 402 and 404, the number of tone-symbols with extra transmission power per OFDM symbol is the same for any rate option.

In general, a segment may use another slope as well, e.g., slope=2, 3, −2, −3, etc., and use different shifts to signal another set of 7 rate options. Note that the patterns with different shifts of the same slope are orthogonal with each other in the sense that there is no overlap between any two patterns. For the coding perspective, the coding distance of the patterns is relatively large. Meanwhile, the patterns with different slopes are not orthogonal, and therefore, the coding distance is relatively small. In one aspect, the patterns with different slopes are used to signal very different rate options, while the patterns with the same slope but different shifts are used to signal similar rate options. In particular, the rate options with QPSK modulation are similar, and are different from the rate option with 16-point QAM.

Figure 5:
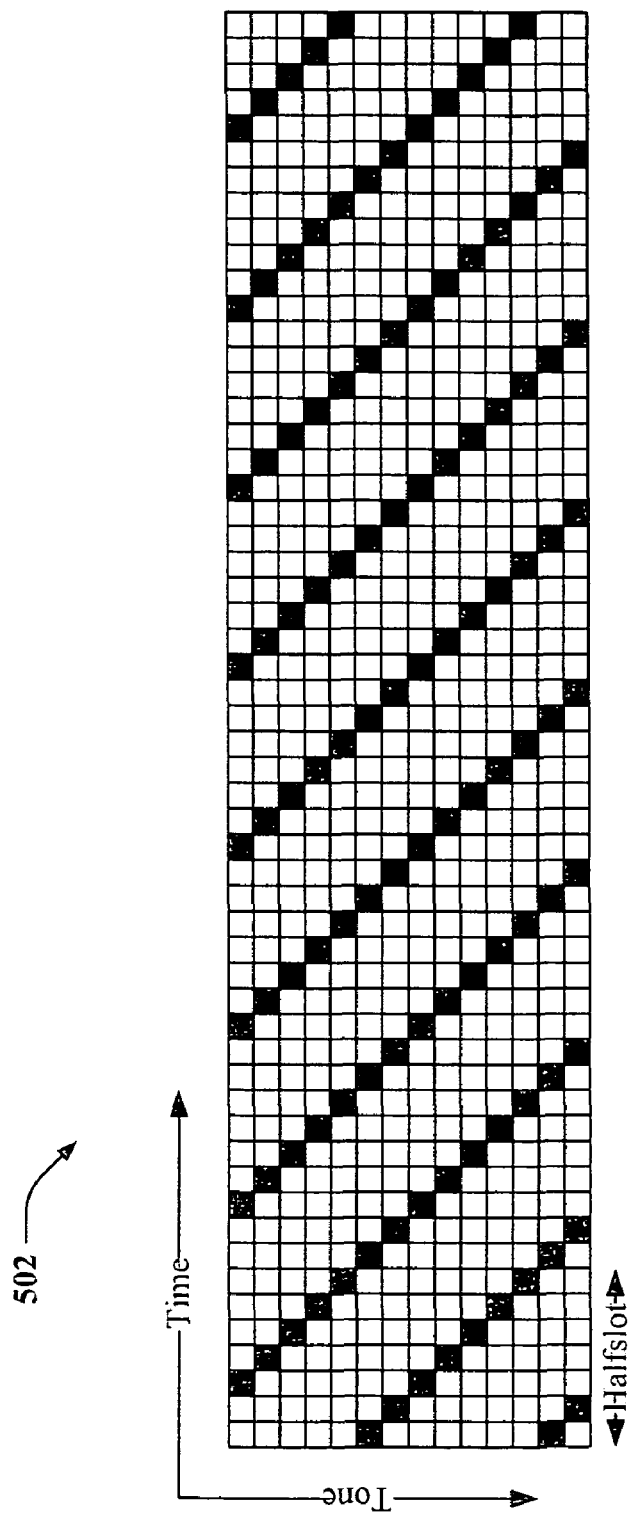
FIG. 5 is an illustration of a 14-tone UL.TCH channel segment=that facilitates indicating a data rate option for a wireless terminal in a wireless communication environment, in accordance with various aspects.

FIG. 5 is an illustration of a 14-tone UL.TCH channel segment 502 that facilitates indicating a data rate option for a wireless terminal in a wireless communication environment, in accordance with various aspects. According to the figure, each half slot may be 7 symbols in duration and may comprise 14 tones. It will be noted that the $14^{th}$ tone of the third symbol period is slated for extra transmission energy (e.g., scaling factor x2), thus indicating a third data rate option (e.g., data rate option 2, in a series of 7 ranging from 0 to 6). Segment 502 also utilizes a negatively sloped pattern to permit indication of up to 7 data rate options in a manner similar to that described above with regard to segment 402. Similarly, a positively sloped power boost pattern may be utilized to permit another 7 data rate options to be described and/or indicated during an uplink traffic transmission. It will be appreciated that more or fewer data rate options may be indicated using other patterns, and that the systems and methods described herein are not limited to utilizing "sloped" patterns only.

With regard to modulation-symbol scaling, a wireless terminal may scale transmission symbols on the UL.TCH according to the two scaling factors mentioned above. For instance, x1 may denote a value related to per-tone average transmission power relative to a nominal transmission power for the terminal (e.g., wtPowerNominal) when transmitting a specified UL.TCH segment, and x2 may be denoted as x2=x1+ULTCHPOWERBOOST, where + is defined in the dB sense and ULTCHPOWERBOOST represents the amount of power boost and is in the range of approximately 1.0 dB to approximately 3.0 dB. Thus, the scaling factors using x1 and x2 may be equal to the square root of (wtPowerNominal) $*10^{x1/20}$ and the square root of (wtPowerNominal)$*10^{x2/20}$, respectively. Therefore, the above modulation-symbol scaling procedure can also be explained as a two-step process.

First, all the modulation-symbols in the segment are power scaled by x1. Then, the modulation-symbols mapped to a particular subset of tone-symbols in the segment as a function of the rate option used in the segment are further power boosted by the amount of ULTCHPOWERBOOST.

In the UL.TCH segment, a subset of tone-symbols may utilize x1 (e.g., white boxes in segments, 402, 404, and 502) and the subset of the remaining tone-symbols may utilize scaling factor x2 (e.g., black boxes in segments 402, 404, and 502). The determination to utilize x1 or x2 may be made based on the tone-symbol to which the modulation symbol is mapped in the operation of segment mapping and on the rate option used in the UL.TCH. For instance, the UL.TCH comprises 112 tone-halfslots, which may be indexed primarily in the ascending order of halfslot index, and secondarily in the ascending order to tone index for those of the same halfslot index. Denote HalfslotRange[0] and HalfslotRange[1] to be the indices of the first (earliest) and the last halfslots of the UL.TCH segment, respectively, and ToneRange[0] and ToneRange[1] to be the indices of the first and the last logical (i.e., prehopping) tones of the UL.TCH segment. At the first halfslot whose index is equal to HalfslotRange[0], the tone-halfslot of logical tone index ToneRange[0] is indexed as 0, the tone-halfslot of logical tone index (ToneRange[0]+1) is indexed as 1, . . . , and the tone-halfslot of logical tone index ToneRange[1] is indexed as (ToneRange[1]-ToneRange[0]). At the second halfslot with index (HalfslotRange[0]+1), the tone-halfslot of logical tone index ToneRange[0] is indexed as (ToneRange[1]-ToneRange[0]+1), and so on, until at the last halfslot of index HalfslotRange[1], the tone-halfslot of logical tone index ToneRange[1] is indexed as 111. Within each tone-halfslot, each of the seven tone-symbols are given a relative index 0:6, where the relative index for the left-most tone-symbol of the tone halfslot is 0 and that for the right-most tone-symbol is 6. The rate option to be utilized in the UL.TCH segment may be denoted as X. For k=0:111, in tone halfslot k, the wireless terminal may utilize scaling factor x2 to scale the modulation symbol that is mapped to the tone-symbol of relative index j, where j=mod(k+X,7) if X=0:6, or j=mod(−k+X,7) if X>6. The wireless terminal may utilize scaling factor x1 to scale modulation symbols that are mapped to the remaining 6 tone-symbols in the tone-halfslot k. It will be appreciated that UL.TCH segment may be assigned by a downlink traffic control channel (DL.TCCH) segment, which may specify a highest rate option to be used in the UL.TCH segment. The rate option actually utilized by the UL.TCH segment may be constrained not to exceed the rate option assigned by the DL.TCCH segment.

Figure 6:
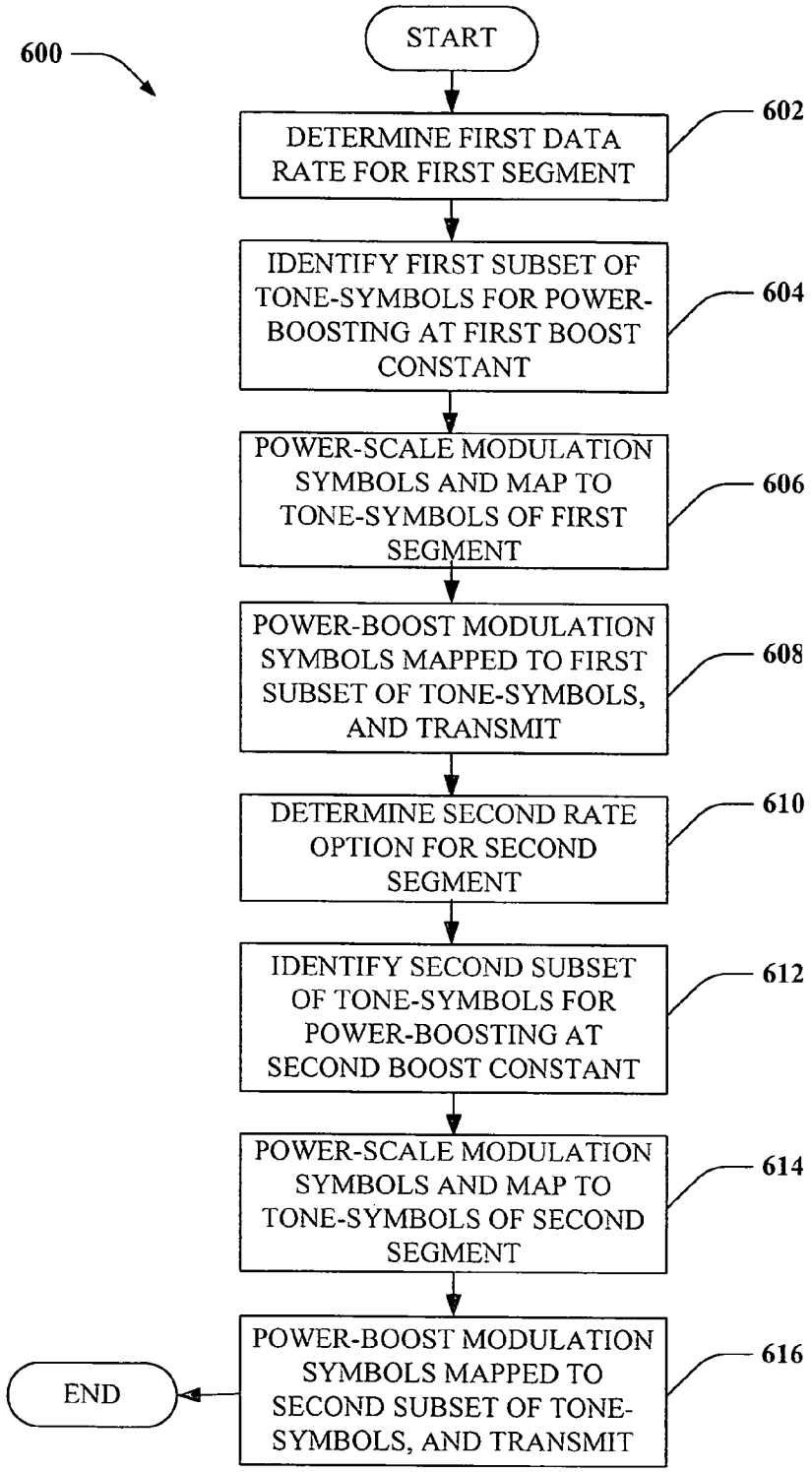
FIG. 6 illustrates a methodology for indicating a first of a plurality of data rate options is being utilized by a wireless terminal, in accordance with one or more aspects.

FIG. 6 illustrates a methodology 600 for indicating a first of a plurality of data rate options is being utilized by a wireless terminal, in accordance with one or more aspects. At 602, a first rate option for use in a first segment may be identified. At 604, as a function of the first rate option, a first subset of tone-symbols of the segment may be identified for power boosting, and a first constant related to the power boost may be determined. At 606, a set of modulation symbols may be power-scaled (e.g., using a scaling factor such as x1, described above) and mapped to the tone-symbols of the segment. At 608, modulation symbols that are mapped to the first subset of tone-symbols may be power boosted (e.g., using a power boost such as ULTCHPOWERBOOST, as described above), and the segment may be transmitted.

A second rate option to be utilized in a second segment may be determined at 610, and may be different from the first rate option. At 612, as a function of the second rate option, a second subset of tone-symbols may be identified for power boosting and a second power boost constant, which is different from the first power boost constant, may be identified. It will be understood that a power boost constant is a decibel value by which transmission energy is increased, or "boosted" during transmission. At 614, a set of modulation symbols may be power-scaled and mapped to the tone-symbols of the segment. At 616, the modulation symbols that are mapped to the second subset of tone-symbols may be power-boosted and transmitted.

It will be appreciated that the number of symbols to be power boosted, i.e., scaled totally by scaling factor x2 described in FIGS. 4 and 5, may remain constant from one halfslot to the next. Frequency may be varied from halfslot to halfslot, but may remain constant within a halfslot. According to still other aspects, data rate options may relate to, without being limited to, for example, a QAM16 modulation protocol, a QAM64 modulation protocol, a QPSK modulation protocol, or any other suitable modulation protocol. For instance, rate options may be a combination of coding rate and modulation protocol. QPSK requires less power, and so may be desirable for far-away wireless terminals. A base station may also inform a wireless terminal as to a highest allowable data rate, upon which the wireless terminal may determine available headroom (remaining power) and/or data left to transmit. The wireless terminal may then signal the selected rate option to the base station to tell the base station how to decode that channel segment.

Figure 7:
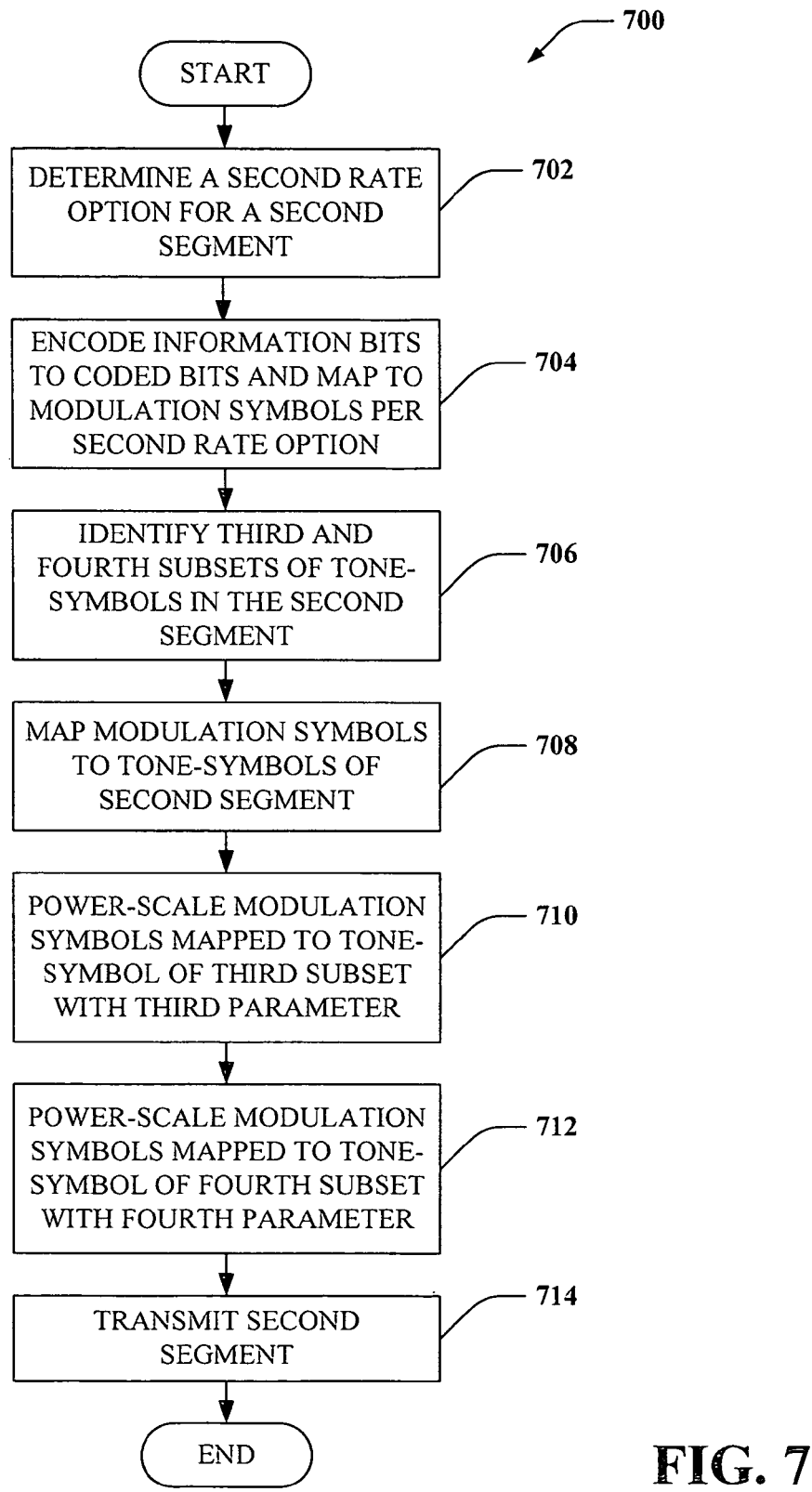
FIG. 7 is an illustration of a methodology indicating at least a second data rate option in addition to the first data rate option, in accordance with one or more aspects.

FIG. 7 is an illustration of a methodology 700 for indicating at least a second data rate option, in addition to the first data rate option indicated using method 600, in accordance with one or more aspects. Method 700 may be read and/or viewed in conjunction with and/or as an extension of method 600, described above with regard to FIG. 6. At 702, a second data rate option for a second segment may be identified. At 704, information bits may be encoded and mapped to modulation symbols in accordance with the second rate option (e.g., 16-QAM, 64-QAM, QPSK, or any other suitable rate option). At 706 third and fourth predetermined subsets of the tone-symbols in the second subset may be identified, e.g., as a function of the second rate option. A tone-symbol is a tone in an OFDM symbol period, and tones may be indexed in a logical order. Additionally, the tone-symbols of the fourth predetermined subset may have a sloped pattern in the second segment when indexed logically.

At 708, modulation symbols may be mapped to tone-symbols in the second segment. A modulation symbol mapped to a tone-symbol of the third subset may be power-scaled using a third parameter (e.g., x1 as described in FIGS. 4 and 5), at 710. At 712, a modulation symbol mapped to a tone-symbol in the fourth subset may be power-scaled using a fourth parameter (e.g., x2 as described in FIGS. 4 and 5). Once the modulation symbols have been power-scaled, the second segment may be transmitted at 714. It will be appreciated that the second and fourth subsets may have different slopes, or may have the same slope that is shifted by one or more symbols in a modulo manner.

Figure 8:
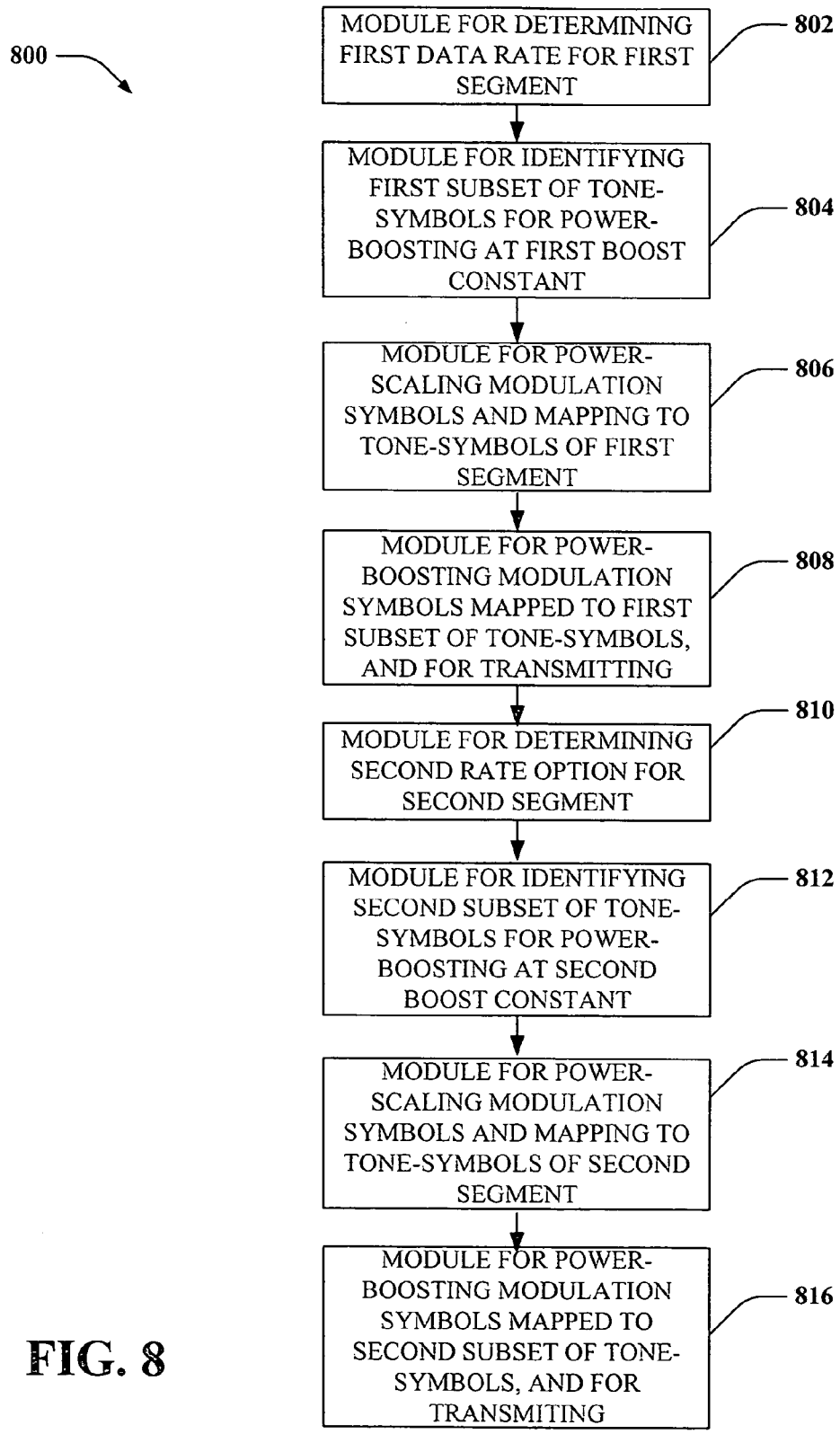
FIG. 8 illustrates a system that facilitates indicating a selected data rate option utilized by a wireless terminal, in accordance with various aspects.

FIG. 8 illustrates a system 800 that facilitates indicating a selected data rate option utilized by a wireless terminal, in accordance with various aspects. System 800 is represented as a series of interrelated functional blocks, which can represent functions implemented by a processor, software, or combination thereof (e.g., firmware). System 800 comprises a module for determining a first data rate 802 for a first data transmission segment, and a module for identifying a first subset of tone-symbols for power-boosting 804 at a first power-boost constant. System 800 further comprises a module for power-scaling and mapping 806 modulation symbols to the tone-symbols of the first segment, and a module for power-boosting and transmitting 808 the modulation symbols mapped to the first subset of tone-symbols. Additionally, system 800 may comprise a module for determining a second data rate option 810 for a second data transmission segment, and a module for identifying a second subset 812 of tone-symbols for power-boosting at a second boost constant. Still furthermore, system 800 may comprise a module for power-scaling and mapping 814 modulation symbols to the tone-symbols of the second segment, and a module for power-boosting and transmitting 816 the modulation symbols mapped to the second subset of tone-symbols. It is to be understood that system 800 and the various modules comprised thereby may carry out the methods described above and/or may impart any necessary functionality to the various systems described herein.

Figure 9:
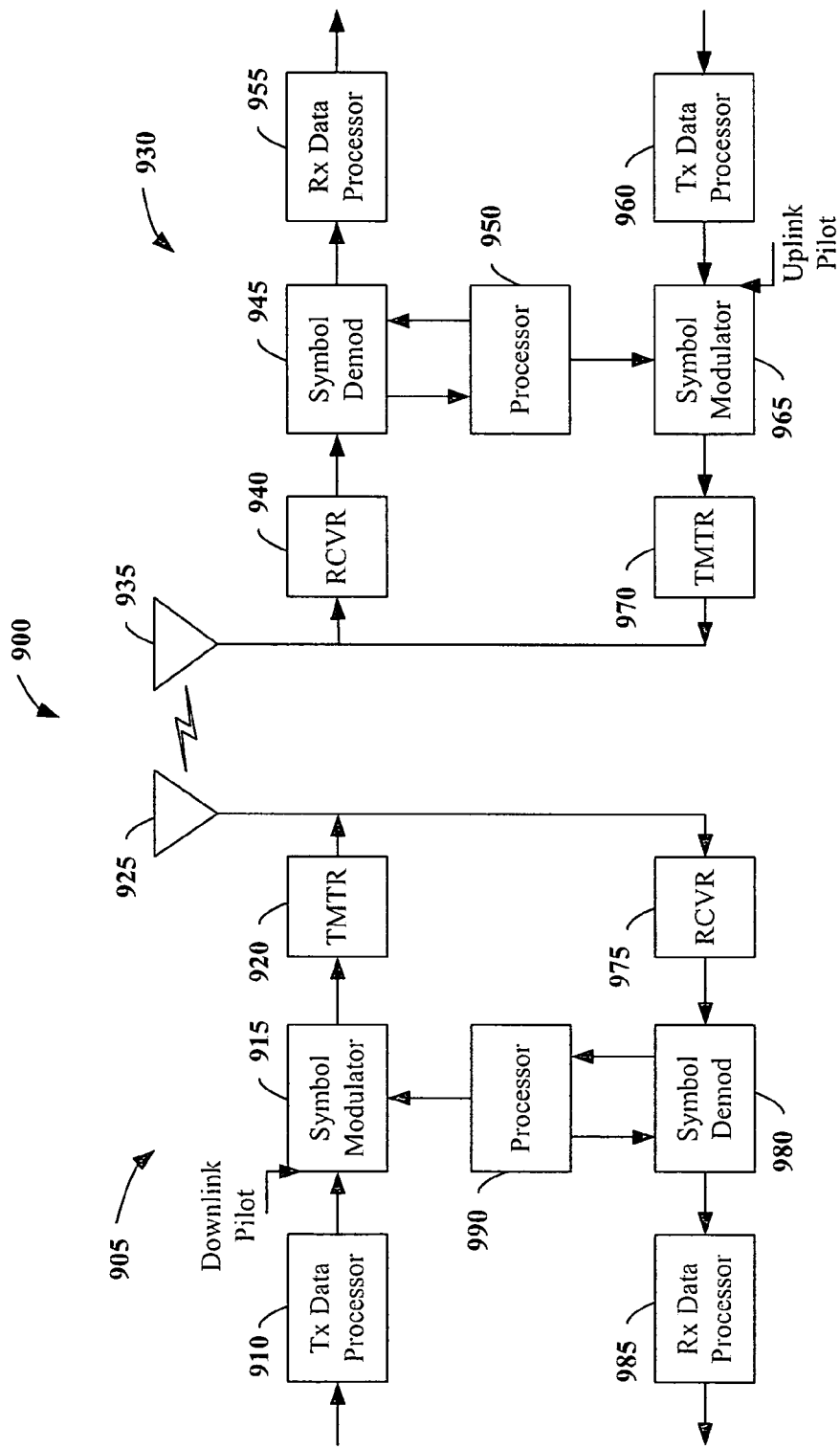
FIG. 9 is an illustration of a wireless communication environment that can be employed in conjunction with the various systems and methods described herein.

FIG. 9 shows an example wireless communication system 900. The wireless communication system 900 depicts one base station and one user device for sake of brevity. However, it is to be appreciated that the system can include more than one base station and/or more than one user device, wherein additional base stations and/or user devices can be substantially similar or different from the exemplary base station and user device described below. In addition, it is to be appreciated that the base station and/or the user device can employ the systems and/or methods described herein.

Referring now to FIG. 9, on a downlink, at access point 905, a transmit (TX) data processor 910 receives, formats, codes, interleaves, and modulates (or symbol maps) traffic data and provides modulation symbols ("data symbols"). A symbol modulator 915 receives and processes the data symbols and pilot symbols and provides a stream of symbols. Symbol modulator 915 multiplexes data and pilot symbols and provides them to a transmitter unit (TMTR) 920. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 920 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 925 to the user devices. At user device 930, an antenna 935 receives the downlink signal and provides a received signal to a receiver unit (RCVR) 940. Receiver unit 940 conditions (e.g., filters, amplifies, and frequency downconverts) the received signal and digitizes the conditioned signal to obtain samples. A symbol demodulator 945 demodulates and provides received pilot symbols to a processor 950 for channel estimation. Symbol demodulator 945 further receives a frequency response estimate for the downlink from processor 950, performs data demodulation on the received data symbols to obtain data symbol estimates (which are estimates of the transmitted data symbols), and provides the data symbol estimates to an RX data processor 955, which demodulates (e.g., symbol demaps), deinterleaves, and decodes the data symbol estimates to recover the transmitted traffic data. The processing by symbol demodulator 945 and RX data processor 955 is complementary to the processing by symbol modulator 915 and TX data processor 910, respectively, at access point 905.

On the uplink, a TX data processor 960 processes traffic data and provides data symbols. A symbol modulator 965 receives and multiplexes the data symbols with pilot symbols, performs modulation, and provides a stream of symbols. A transmitter unit 970 then receives and processes the stream of symbols to generate an uplink signal, which is transmitted by the antenna 935 to the access point 905.

At access point 905, the uplink signal from user device 930 is received by the antenna 925 and processed by a receiver unit 975 to obtain samples. A symbol demodulator 980 then processes the samples and provides received pilot symbols and data symbol estimates for the uplink. An RX data processor 985 processes the data symbol estimates to recover the traffic data transmitted by user device 930. A processor 990 performs channel estimation for each active user device transmitting on the uplink. Multiple user devices may transmit pilot concurrently on the uplink on their respective assigned sets of pilot subcarriers, where the pilot subcarrier sets may be interlaced.

Processors 990 and 950 direct (e.g., control, coordinate, manage, etc.) operation at access point 905 and user device 930, respectively. Respective processors 990 and 950 can be associated with memory units (not shown) that store program codes and data. Processors 990 and 950 can utilize any of the methodologies described herein. Respective Processors 990 and 950 can also perform computations to derive frequency and impulse response estimates for the uplink and downlink, respectively.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of indicating an uplink data rate for a first transmission segment in an OFDM wireless communication environment, comprising operating a communications device to perform the steps of:
    determining a first rate option to be used in the first transmission segment;
    encoding information bits to coded bits and mapping coded bits to modulation symbols in accordance with the first rate option;
    identifying a first predetermined subset and a second predetermined subset of tone-symbols in the first transmission segment as a function of the first rate option, wherein a tone-symbol is a tone in an OFDM symbol period and tones are indexed in a logical order;
    mapping the modulation symbols to the tone-symbols of the first transmission segment;
    power-scaling a modulation symbol mapped to a tone-symbol of the first predetermined subset with a first parameter;
    power-scaling a modulation symbol mapped to a tone-symbol of the second predetermined subset with a second parameter, the second parameter being different from the first parameter;
    transmitting the first transmission segment;
    wherein said first transmission segment includes multiple tone-symbols in each of a plurality of consecutive symbol transmission time periods; and
    wherein said first predetermined subset of tone-symbols includes more tone-symbols than said second predetermined subset of tone-symbols.

2. The method of claim 1, further comprising modulating a modulation symbol mapped to a tone-symbol to a physical frequency in accordance with a logical tone index of the tone-symbol and a logical-to-physical tone mapping function.

3. The method of claim 1, wherein a ratio of the second parameter and the first parameter is a predetermined number.

4. The method of claim 3, wherein the predetermined number is a constant in the range of 1 dB and 3 dB.

5. The method of claim 3, wherein the predetermined number is a function of the first rate option and in the range of 1 dB and 3 dB.

6. The method of claim 5, wherein the ratio is between approximately 2.0 dB and approximately 3.0 dB when the first rate option corresponds to a QPSK modulation scheme, and the ratio is between approximately 1.5 dB and approximately 2.5 dB when the first rate option corresponds to a 16-point QAM modulation scheme.

7. The method of claim 3, wherein the number of tone-symbols in the second predetermined subset is a constant in any OFDM symbols.

8. The method of claim 7, wherein the tone-symbols in the second predetermined subset has a sloped pattern in the segment.

9. The method of claim 8, further comprising:
    determining a second rate option to be used in a second transmission segment;
    encoding information bits to coded bits and mapping coded bits to modulation symbols in accordance with the second rate option;
    identifying a third predetermined subset and a fourth predetermined subset of tone-symbols in the second transmission segment as a function of the second rate option, tone-symbols in the fourth predetermined subset having a sloped pattern in the second transmission segment;
    mapping the modulation symbols to the tone-symbols of the second transmission segment;
    power scaling a modulation symbol mapped to a tone-symbol of the third predetermined subset with a third parameter;
    power scaling a modulation symbol mapped to a tone-symbol of the fourth predetermined subset with a fourth parameter, the fourth parameter being different from the third parameter, wherein a ratio of the fourth parameter to the third parameter is a fixed number; and
    transmitting the second transmission segment.

10. The method of claim 9, wherein a slope of the second predetermined subset is the same as a slope of the fourth predetermined subset, and wherein the second and the fourth predetermined subsets have different shifts.

11. The method of claim 9, wherein a slope of the second predetermined subset is different from a slope of the fourth predetermined subset.

12. The method of claim 1, wherein the first predetermined subset includes a first tone-symbol in an OFDM symbol and the second predetermined subset includes a second tone-symbol in said OFDM symbol, said first and second tone-symbols being different tone-symbols.

13. The method of claim 1,
wherein said modulation symbol mapped to a tone-symbol of the first predetermined subset which is power-scaled with a first parameter corresponds to an OFDM symbol; and
wherein power-scaling a modulation symbol mapped to a tone-symbol of the second predetermined subset includes providing a power boost to said modulation symbol mapped to the tone-symbol of the second predetermined subset over an amount of power provided by power-scaling with the first parameter, said modulation symbol mapped to a tone-symbol of the second predetermined subset corresponding to said OFDM symbol.

14. The method of claim 1, wherein a tone-symbol corresponding to said first predetermined subset of tone-symbols and a tone-symbol corresponding to said second predetermined subset of tone-symbols is included in a set of tone-symbols corresponding to a single OFDM symbol transmission time period.

15. The method of claim 1, wherein tone-symbols in the first predetermined subset and tone-symbols in the second predetermined subset communicate information bits encoded and modulated in accordance with the same rate option, said same rate option being said first rate option.

16. The method of claim 1, wherein said second predetermined subset of tone symbols form a pattern in said first transmission segment, said pattern indicating said first rate option.

17. An apparatus that facilitates indicating an uplink data rate for transmission segments in an OFDM wireless communication environment, comprising:
a processor that determines a first rate option to be used in a first transmission segment, and identifies a first predetermined subset and a second predetermined subset of tone-symbols in the first transmission segment as a function of the first rate option, wherein a tone-symbol is a tone in an OFDM symbol period and tones are indexed in a logical order;
an encoder that encodes information bits to coded bits, maps coded bits to modulation symbols in accordance with the first rate option, and maps the modulation symbols to the tone-symbols of the first transmission segment;
a transmitter that power-scales a modulation symbol mapped to a tone-symbol of the first predetermined subset with a first parameter, power-scales a modulation symbol mapped to a tone-symbol of the second predetermined subset with a second parameter, the second parameter being different from the first parameter, and transmits the first transmission segment
wherein said first transmission segment includes multiple tone-symbols in each of a plurality of consecutive symbol transmission time periods; and
wherein said first predetermined subset of tone-symbols includes more tone-symbols than said second predetermined subset of tone-symbols.

18. The apparatus of claim 17, wherein the encoder modulates a modulation symbol mapped to a tone-symbol to a physical frequency in accordance with a logical tone index of the tone-symbol and a logical-to-physical tone mapping function.

19. The apparatus of claim 17, wherein a ratio of the second parameter and the first parameter is a predetermined number.

20. The apparatus of claim 19, wherein the predetermined number is a constant in the range of 1 dB and 3 dB.

21. The apparatus of claim 19, wherein the predetermined number is a function of the first rate option and in the range of 1 dB and 3 dB.

22. The apparatus of claim 21, wherein the ratio is between approximately 2.0 dB and approximately 3.0 dB when the first rate option corresponds to a QPSK modulation scheme, and the ratio is between approximately 1.5 dB and approximately 2.5 dB when the first rate option corresponds to a 16-point QAM modulation scheme.

23. The apparatus of claim 19, wherein the number of tone-symbols in the second predetermined subset is a constant in any OFDM symbols.

24. The apparatus of claim 13, wherein the tone-symbols in the second predetermined subset have a sloped pattern in the first transmission segment.

25. The apparatus of claim 24, wherein:
the processor determines a second rate option to be used in a second transmission segment, and identifies third and fourth predetermined subsets of tone-symbols in the second transmission segment, as a function of the second rate option, tone-symbols in the fourth predetermined subset having a sloped pattern in the second transmission segment;
the encoder encodes information bits to coded bits, maps coded bits to modulation symbols in accordance with the second rate option, and maps the modulation symbols to the tone-symbols of the second transmission segment; and
the transmitter power-scales a modulation symbol mapped to a tone-symbol of the third predetermined subset with a third parameter, power-scales a modulation symbol mapped to a tone-symbol of the fourth predetermined subset with a fourth parameter, the fourth parameter being different from the third parameter, wherein a ratio of the fourth parameter to the third parameter is a fixed number, and transmits the second transmission segment.

26. The apparatus of claim 25, wherein the slope of the second predetermined subset is the same as the slope of the fourth predetermined subset, and the second and the fourth predetermined subsets have different shifts.

27. The apparatus of claim 25, wherein the slope of the second predetermined subset is different from the slope of the fourth predetermined subset.

28. An apparatus that facilitates indicating an uplink data rate for transmission segments in an OFDM wireless communication environment, comprising:
means for determining a rate option to be used in a first transmission segment;
means for encoding information bits to coded bits and mapping coded bits to modulation symbols in accordance with the first rate option;
means for identifying a first predetermined subset and a second predetermined subset of tone-symbols in the first transmission segment as a function of the first rate option, wherein a tone-symbol is a tone in an OFDM symbol period and tones are indexed in a logical order;
means for mapping the modulation symbols to the tone-symbols of the first transmission segment;
means for power-scaling a modulation symbol mapped to a tone-symbol of the first predetermined subset with a first parameter;
means for power-scaling a modulation symbol mapped to a tone-symbol of the second predetermined subset with a second parameter, the second parameter being different from the first parameter;
means for transmitting the first transmission segment;

wherein said first transmission segment includes multiple tone-symbols in each of a plurality of consecutive symbol transmission time periods; and wherein said first predetermined subset of tone-symbols includes more tone-symbols than said second predetermined subset of tone-symbols.

29. The apparatus of claim 28, further comprising modulating a modulation symbol mapped to a tone-symbol to a physical frequency in accordance with a logical tone index of the tone-symbol and a logical-to-physical tone mapping function.

30. The apparatus of claim 28, wherein a ratio of the second parameter and the first parameter is a predetermined number.

31. The apparatus of claim 30, wherein the predetermined number is a constant in the range of 1 dB and 3 dB.

32. The apparatus of claim 30, wherein the predetermined number is a function of the first rate option and in the range of 1 dB and 3 dB.

33. The apparatus of claim 32, wherein the ratio is between approximately 2.0 dB and approximately 3.0 dB when the first rate option corresponds to a QPSK modulation scheme, and the ratio is between approximately 1.5 dB and approximately 2.5 dB when the first rate option corresponds to a 16-point QAM modulation scheme.

34. The apparatus of claim 30, wherein the number of tone-symbols in the second predetermined subset is a constant in any OFDM symbols.

35. The apparatus of claim 34, wherein the tone-symbols in the second predetermined subset has a sloped pattern in the segment.

36. The apparatus of claim 35, further comprising:
means for determining a second rate option to be used in a second transmission segment;
means for encoding information bits to coded bits and mapping coded bits to modulation symbols in accordance with the second rate option;
means for identifying a third predetermined subset and a fourth predetermined subset of tone-symbols in the second transmission segment as a function of the second rate option, tone-symbols in the fourth predetermined subset having a sloped pattern in the second transmission segment;
means for mapping the modulation symbols to the tone-symbols of the second transmission segment;
means for power scaling a modulation symbol mapped to a tone-symbol of the third predetermined subset with a third parameter;
means for power scaling a modulation symbol mapped to a tone-symbol of the fourth predetermined subset with a fourth parameter, the fourth parameter being different from the third parameter, wherein the ratio of the fourth parameter to the third parameter is a fixed number;
means for transmitting the second transmission segment
wherein said first transmission segment includes multiple tone-symbols in each of a plurality of consecutive symbol transmission time periods; and
wherein said first predetermined subset of tone-symbols includes more tone-symbols than said second predetermined subset of tone-symbols.

37. The apparatus of claim 36, wherein a slope of the second predetermined subset is the same as a slope of the fourth predetermined subset, and the second and the fourth predetermined subsets have different shifts.

38. The apparatus of claim 36, wherein a slope of the second predetermined subset is different from a slope of the fourth predetermined subset.

39. A non-transitory computer-readable medium embodying computer-executable instructions which when executed by a processor, control a communications apparatus to operate in accordance with said computer-executable instructions, said computer executable instructions comprising:
instructions for controlling said apparatus to determine a first rate option to be used in a first transmission segment;
instructions for controlling said apparatus to encode information bits to coded bits and mapping coded bits to modulation symbols in accordance with the first rate option;
instructions for controlling said apparatus to identify a first predetermined subset and a second predetermined subset of tone-symbols in the first transmission segment as a function of the first rate option, wherein a tone-symbol is a tone in an OFDM symbol period and tones are indexed in a logical order;
instructions for controlling said apparatus to map the modulation symbols to the tone-symbols of the first transmission segment;
instructions for controlling said apparatus to power-scale a modulation symbol mapped to a tone-symbol of the first predetermined subset with a first parameter;
instructions for controlling said apparatus to power-scale a modulation symbol mapped to a tone-symbol of the second predetermined subset with a second parameter, the second parameter being different from the first parameter;
instructions for controlling said apparatus to transmit the first transmission segment;
wherein said first transmission segment includes multiple tone-symbols in each of a plurality of consecutive symbol transmission time periods; and
wherein said first predetermined subset of tone-symbols includes more tone-symbols than said second predetermined subset of tone-symbols.

40. The non-transitory computer-readable medium of claim 39, wherein said computer executable instructions further comprise instructions for controlling said apparatus to modulate a modulation symbol mapped to a tone-symbol to a physical frequency in accordance with a logical tone index of the tone-symbol and a logical-to-physical tone mapping function.

41. The non-transitory computer-readable medium of claim 39, wherein a ratio of the second parameter and the first parameter is a predetermined number.

42. The non-transitory computer-readable medium of claim 41, wherein the predetermined number is a constant in the range of 1 dB and 3 dB.

43. The non-transitory computer-readable medium of claim 41, wherein the predetermined number is a function of the first rate option and in the range of 1 dB and 3 dB.

44. The non-transitory computer-readable medium of claim 43, wherein the ratio is between approximately 2.0 dB and approximately 3.0 dB when the first rate option corresponds to a QPSK modulation scheme, and the ratio is between approximately 1.5 dB and approximately 2.5 dB when the first rate option corresponds to a 16-point QAM modulation scheme.

45. The non-transitory computer-readable medium of claim 41, wherein the number of tone-symbols in the second predetermined subset is a constant in any OFDM symbols.

46. The non-transitory computer-readable medium of claim 45, wherein the tone-symbols in the second predetermined subset has a sloped pattern in the segment.

47. The non-transitory computer-readable medium of claim 46, wherein said computer-executable instructions further comprise:
    instructions for controlling said apparatus to determine a second rate option to be used in a second transmission segment;
    instructions for controlling said apparatus to encode information bits to coded bits and mapping coded bits to modulation symbols in accordance with the second rate option;
    instructions for controlling said apparatus to identify a third predetermined subset and a fourth predetermined subset of tone-symbols in the second transmission segment as a function of the second rate option, wherein a tone-symbol is a tone in an OFDM symbol period and tones are indexed in a logical order and tone-symbols in the fourth predetermined subset has a sloped pattern in the second transmission segment;
    instructions for controlling said apparatus to map the modulation symbols to the tone-symbols of the second transmission segment;
    instructions for controlling said apparatus to power scale a modulation symbol mapped to a tone-symbol of the third predetermined subset with a third parameter;
    instructions for controlling said apparatus to power scale a modulation symbol mapped to a tone-symbol of the fourth predetermined subset with a fourth parameter, the fourth parameter being different from the third parameter, wherein a ratio of the fourth parameter to the third parameter is a fixed number; and
    instructions for controlling said apparatus to transmit the second transmission segment.

48. The non-transitory computer-readable medium of claim 47, wherein a slope of the second predetermined subset is the same as a slope of the fourth predetermined subset, and the second and the fourth predetermined subsets have different shifts.

49. The non-transitory computer-readable medium of claim 47, wherein a slope of the second predetermined subset is different from a slope of the fourth predetermined subset.

50. A communications device comprising:
    a processor that executes computer-executable instructions for indicating an uplink data rate for transmission segments in an OFDM wireless communication environment, said processor being configured to control said communications device to:
        determine a first rate option to be used in a first transmission segment;
        encode information bits to coded bits and mapping coded bits to modulation symbols in accordance with the first rate option;
        identify a first predetermined subset and a second predetermined subset of tone-symbols in the first transmission segment as a function of the first rate option, wherein a tone-symbol is a tone in an OFDM symbol period and tones are indexed in a logical order;
        map the modulation symbols to the tone-symbols of the first transmission segment;
        power-scale a modulation symbol mapped to a tone-symbol of the first predetermined subset with a first parameter;
        power-scale a modulation symbol mapped to a tone-symbol of the second predetermined subset with a second parameter, the second parameter being different from the first parameter; and
        transmit the first transmission segment;
    wherein said first transmission segment includes multiple tone-symbols in each of a plurality of consecutive symbol transmission time periods;
    wherein said first predetermined subset of tone-symbols includes more tone-symbols than said second predetermined subset of tone-symbols; and
    a memory coupled to said processor.

51. The processor of claim 50, wherein the processor is further configured to modulate a modulation symbol mapped to a tone-symbol to a physical frequency in accordance with a logical tone index of the tone-symbol and a logical-to-physical tone mapping function.

52. The processor of claim 50, wherein a ratio of the second parameter and the first parameter is a predetermined number.

53. The processor of claim 52, wherein the predetermined number is a constant in the range of 1 dB and 3 dB.

54. The processor of claim 52, wherein the predetermined number is a function of the first rate option and in the range of 1 dB and 3 dB.

55. The processor of claim 54, wherein the ratio is between approximately 2.0 dB and approximately 3.0 dB when the first rate option corresponds to a QPSK modulation scheme, and the ratio is between approximately 1.5 dB and approximately 2.5 dB when the first rate option corresponds to a 16-point QAM modulation scheme.

56. The processor of claim 52, wherein the number of tone-symbols in the second predetermined subset is a constant in any OFDM symbols.

57. The processor of claim 56, wherein the tone-symbols in the second predetermined subset has a sloped pattern in the first transmission segment.

58. The processor of claim 57, wherein the processor is further configured to:
    determine a second rate option to be used in a second transmission segment;
    encode information bits to coded bits and mapping coded bits to modulation symbols in accordance with the second rate option;
    identify a third predetermined subset and a fourth predetermined subset of tone-symbols in the second segment as a function of the second rate option, tone-symbols in the fourth predetermined subset having a sloped pattern in the second transmission segment;
    map the modulation symbols to the tone-symbols of the second transmission segment;
    power scale a modulation symbol mapped to a tone-symbol of the third predetermined subset with a third parameter;
    power scale a modulation symbol mapped to a tone-symbol of the fourth predetermined subset with a fourth parameter, the fourth parameter being different from the third parameter, wherein a ratio of the fourth parameter to the third parameter is a fixed number; and
    transmit the second transmission segment.

59. The processor of claim 58, wherein a slope of the second predetermined subset is the same as a slope of the fourth predetermined subset, and the second and the fourth predetermined subsets have different shifts.

60. The processor of claim 58, wherein a slope of the second predetermined subset is different from a slope of the fourth predetermined subset.

* * * * *